(12) United States Patent
Yang et al.

(10) Patent No.: US 10,883,000 B1
(45) Date of Patent: Jan. 5, 2021

(54) CHEMICALLY MODIFIED SURFACES WITH SELF-ASSEMBLED AROMATIC FUNCTIONALITIES

(71) Applicant: The Regents of the University of California, Oakland, CA (US)

(72) Inventors: Jenny Y. Yang, Irvine, CA (US); Brian R. Lydon, Torrance, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 502 days.

(21) Appl. No.: 15/454,878

(22) Filed: Mar. 9, 2017

Related U.S. Application Data

(60) Provisional application No. 62/305,884, filed on Mar. 9, 2016.

(51) Int. Cl.
| | | |
|---|---|---|
| *C09D 5/08* | (2006.01) | |
| *C07F 17/02* | (2006.01) | |
| *G01N 27/30* | (2006.01) | |
| *C23F 13/00* | (2006.01) | |

(52) U.S. Cl.
CPC ............. *C09D 5/086* (2013.01); *C07F 17/02* (2013.01); *C23F 13/00* (2013.01); *G01N 27/30* (2013.01)

(58) Field of Classification Search
CPC .......... C09D 5/086; C23F 13/00; C07F 17/02; G01N 27/30
See application file for complete search history.

(56) References Cited

U.S. PATENT DOCUMENTS 7,713,711 B2 * 5/2010 O'Connor .............. B82Y 15/00
435/7.1

OTHER PUBLICATIONS

R. W. Murray, Acc. Chem. Res., 1980, 13, 135-141.
R. W. Murray, A. G. Ewing and R. A. Durst, Anal. Chem., 1987, 59, 379A-390A.
B. Ulgut and H. D. Abruña, Chem. Rev., 2008, 108, 2721-2736.
E. Bakker and Y. Qin, Anal. Chem., 2006, 78, 3965-3984.
C. E. D. Chidsey, Science, 1991, 251, 919-922.
C. Amatore, E. Maisonhaute, B. Schöllhorn and J. Wadhawan, ChemPhysChem, 2007, 8, 1321-1329.
H. D. Sikes, J. F. Smalley, S. P. Dudek, A. R. Cook, M. D. Newton, C. E. D. Chidsey and S. W. Feldberg, Science, 2001, 291, 1519-1523.
R.A. Durst and E. A. Blubaugh, in Fundamentals and Applications of Chemical Sensors, American Chemical Society, 1986, vol. 309, ch. 14, pp. 245-255.
J. C. Love, L. A. Estroff, J. K. Kriebel, R. G. Nuzzo and G. M. Whitesides, Chem. Rev., 2005, 105, 1103-1170.
P. D. Tran, A. Le Goff, J. Heidkamp, B. Jousselme, N. Guillet, S. Palacin, H. Dau, M. Fontecave and V. Artero, Angew. Chem., Int. Ed. Engl., 2011, 50, 1371-1374.
J. D. Blakemore, A. Gupta, J. J. Warren, B. S. Brunschwig and H. B. Gray, J. Am. Chem. Soc., 2013, 135, 18288-18291.
L. Yang, H. Ozawa, M. Koumoto, K. Yoshikawa, M. Matsunaga and M.-A. Haga, Chem. Lett., 2015, 44, 160-162.
A. Navaee and A. Salimi, J. Mater. Chem. A, 2015, 3, 7623-7630.
N. Kong, J. J. Gooding and J. Liu, J. Solid State Electrochem., 2014, 18, 3379-3386.
B. Reuillard, A. Le Goff and S. Cosnier, Chem. Commun., 2014, 50, 11731-11734.
C. Walgama and S. Krishnan, J. Electrochem. Soc., 2014, 161, H47-H52.
N. Lalaoui, K. Elouarzaki, A. L. Goff, M. Holzinger and S. Cosnier, Chem. Commun., 2013, 49, 9281-9283.
A. Le Goff, B. Reuillard and S. Cosnier, Langmuir, 2013, 29, 8736-8742.
E. J. Parra, F. X. Rius and P. Blondeau, Analyst, 2013, 138, 2698-2703.
S.-N. Ding, D. Shan, S. Cosnier and A. Le Goff, Chem.—Eur. J., 2012, 18, 11564-11568.
A. Le Goff, K. Gorgy, M. Holzinger, R. Haddad, M. Zimmerman and S. Cosnier, Chem.—Eur. J., 2011, 17, 10216-10221.
J. Bartelmess, B. Ballesteros, G. De La Torre, D. Kiessling, S. Campidelli, M. Prato, T. Torres and D. M. Guldi, J. Am. Chem. Soc., 2010, 132, 16202-16211.
S. D. Mhaske, M. Ray and S. Mazumdar, Inorg. Chim. Acta, 2010, 363, 2804-2811.
J. Liu, O. Bibari, P. Mailley, J. Dijon, E. Rouviere, F. Sauter-Starace, P. Caillat, F. Vinet and G. Marchand, New J. Chem., 2009, 33, 1017-1024.
W. Birch, A. Carré and K. L. Mittal, in Developments in Surface Contamination and Cleaning, ed. R. K. L. Mittal, William Andrew Publishing, Norwich, NY, 2008, DOI: 10.1016/B978-081551555-5.50015-0, pp. 693-723.
D. Jiao, J. Geng, X. J. Loh, D. Das, T.-C. Lee and O. A. Scherman, Angew. Chem. Int. Ed., 2012, 51, 9633-9637.
J. L. Bartels, P. Lu, A. Walker, K. Maurer and K. D. Moeller, Chem. Commun., 2009, DOI: 10.1039/B910577H, 5573-5575.

(Continued)

*Primary Examiner* — Cheng Yuan Huang
(74) *Attorney, Agent, or Firm* — Nguyen Tarbet LLC

(57) ABSTRACT

Materials and methods of modifying an electrode surface are described herein. Self-assembled monolayers (SAM) of polyaromatic molecules covalently attached and form a graphitic-like surface on the electrode surface. After covalent attachment of the polyaromatic monolayer to the surface, polyaromatic-functionalized molecular species is physisorbed onto the surface using the π-interactions. This concept can be applied to generate high performance electrode materials modified with molecular species. The electrode materials can be applied in photoelectrochemical cells, electrochemical cells, sensors, and electrochromic materials. This approach overcomes the major synthetic challenges to modifying surfaces with molecular species, in addition to protecting the surfaces from corrosion.

8 Claims, 18 Drawing Sheets
(8 of 18 Drawing Sheet(s) Filed in Color)

(56) References Cited

OTHER PUBLICATIONS

J. M. Tour, L. Jones, D. L. Pearson, J. J. S. Lamba, T. P. Burgin, G. M. Whitesides, D. L. Allara, A. N. Parikh and S. Atre, J. Am. Chem. Soc., 1995, 117, 9529-9534.
P. Angelova, H. Vieker, N.-E. Weber, D. Matei, O. Reimer, I. Meier, S. Kurasch, J. Biskupek, D. Lorbach, K. Wunderlich, L. Chen, A. Terfort, M. Klapper, K. Müllen, U. Kaiser, A. Gölzhäuser and A. Turchanin, ACS Nano, 2013, 7, 6489-6497.
J. Trasobares, F. Vaurette, M. François, H. Romijn, J.-L. Codron, D. Vuillaume, D. Théron and N. Clément, Beilstein J. Nanotechnol., 2014, 5, 1918-1925.
L. P. Méndez De Leo, E. De La Llave, D. Scherlis and F. J. Williams, J. Chem. Phys., 2013, 138, 114707.
C. E. D. Chidsey, C. R. Bertozzi, T. M. Putvinski and A. M. Mujsce, J. Am. Chem. Soc., 1990, 112, 1301-4306.
N. G. Connelly and W. E. Geiger, Chem. Rev., 1996, 96, 877-910.

\* cited by examiner

CHEMICALLY MODIFIED SURFACES WITH SELF-ASSEMBLED AROMATIC FUNCTIONALITIES

CROSS REFERENCE

This application claims priority to U.S. Patent Application No. 62/305,884, filed Mar. 9, 2016, the specification(s) of which is/are incorporated herein in their entirety by reference.

FIELD OF THE INVENTION

The present invention relates to materials and methods for chemically modifying surfaces with molecular species to tailor the physical properties of said surfaces and protect against corrosion.

BACKGROUND OF THE INVENTION

Electrode surfaces modified with redox-active molecules have demonstrated significant utility in fundamental electron transfer studies and the development of tailored electroresponsive materials. Preparation of chemically modified electrodes typically requires attachment of the target molecular complex to the surface via covalent bonds. However, the reactive functional groups used to form covalent bonds to electrode surfaces (i.e. thiols to metallic surfaces, carboxylic acids and phosphonic acids to metal oxides) are often synthetically incompatible with molecular complexes containing open coordination sites or sensitive functional groups. Functionalizing sensitive molecular species with these reactive functional groups has proven to be synthetically challenging, and often results in molecular decomposition or deactivation. The technical challenges inherent to this approach have limited the scope of molecular complexes that can be used for electrode surface modification.

In contrast, physisorption of pyrene functionalized molecular complexes to carbon nanotubes or graphitic electrodes (i.e. highly oriented pyrolytic graphite) has been very successful. The $\pi$-$\pi$ interaction at the interface demonstrates facile electron transfer between the electrode and molecular complexes. Additionally, pyrene is relatively inert and has already been successfully installed on a broad range of molecular complexes and sensitive biological molecules with desirable catalytic, redox, or sensing properties. However, this approach of non-covalent attachment had been limited to modifying carbon-based electrodes with aromatic character.

As described herein, the present invention addresses this problem by extending non-covalent attachment of molecular complexes onto non-carbon electrodes by pre-functionalizing the surface with covalently bound polyaromatics, such as pyrene, coronene, and anthracene.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

Chemically modifying electrode surfaces with redox active molecular complexes is an effective route to fabricating tailored functional materials with specific bulk and surface properties. Surface modification has generally required the installation of reactive functional groups for direct covalent attachment that can present synthetic challenges. For instance, the formation of disulfides prior to gold functionalization required the need to use a protected thiolate for attachment.

The present invention provides an alternative, milder method that utilizes $\pi$-interactions to physisorb the molecular complex onto a surface is described herein.

Polyaromatics, such as pyrenes, coronenes, and anthracenes, are relatively chemically inert and compatible with the reactive functional groups used to form covalent bonds to photovoltaic surfaces. An additional benefit of using polyaromatics is that it can be covalently attached to the surface to increase stability. In one embodiment, a gold electrode was initially modified with pyrene via covalent thiolate bonds. A pyrene-functionalized ferrocene was then physisorbed onto the pyrene-modified gold electrode. X-ray photoelectron spectroscopy, infrared spectroscopy, and cyclic voltammetry were used to demonstrate successful physisorption of the pyrene-functionalized ferrocene onto the pyrene-modified gold surface. Physisorption is attributed to pyrene-pyrene ($\pi$) interactions, as the ferrocene compound was not observed after identical treatment of a clean gold electrode surface. Additionally, cyclic voltammetry demonstrates facile electron transfer between the electrode and ferrocene through the non-covalent interactions at the interface.

One of the unique and inventive technical features of the present invention is that the surface modification only requires functionalizing the target molecular complex with the relatively inert aromatic functionality Without wishing to limit the invention to any theory or mechanism, it is believed that the technical feature of the present invention can advantageously broaden the range of experimentally accessible molecular precursors for chemically modified electrodes. The attachment using the aromatic functionality was surprisingly found to be robust over many electrochemical cycles, and was resistant to rinsing with solvent in which the target molecular analyte was soluble. An additional challenge this technology addresses is improved resistance against corrosion, which is a major problem for electrode stability during operation, and many exposed surfaces in general. None of the presently known prior references or work has the unique inventive technical feature of the present invention.

In one embodiment, the present invention features a method of modifying a surface of an electrode substrate. The method may comprise providing the electrode substrate, depositing a layer of a polyaromatic derivative on the surface of the electrode substrate, thereby forming a polyaromatic-functionalized electrode surface, depositing a molecular analyte complex on the polyaromatic-functionalized electrode surface, thereby forming a surface-modified electrode substrate.

In another embodiment, the present invention features a two-part surface modification agent for an electrode substrate. The surface modification agent may comprise a polyaromatic derivative having a reactive functional group that is configured to covalently binding to a surface of the electrode substrate, and a molecular analyte complex comprising a molecular analyte functionalized with a polyaromatic moiety.

In yet another embodiment, the two-part surface modification agent may be used to modify the surface of any electrode to produce a surface-modified electrode. The surface-modified electrode may comprise a conductive substrate, and a surface modifying layer comprising the two-part surface modification agent and disposed on a surface of the conductive substrate.

In some embodiments, the present invention can be used to modify surfaces for a variety of applications, including, but not limited to, new photoelectrochemical or electrode materials that incorporate electrocatalysts for chemical fuel formation or biomass reforming, and incorporating redox active molecular materials for use as electro responsive sensors tailored for specific analytes, including biological or chemical targets. Modifying electrode surfaces with molecular materials is also a promising route to electroresponsive materials that alter surface properties with an applied electric potential. This includes the generation of electrochromic materials, or other surfaces with adjustable interfacial properties.

BRIEF DESCRIPTION OF THE DRAWINGS

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 21A shows variable scan rate cyclic voltammogram of a chemically modified gold working electrode in 0.1 M $HClO_4$ solution with Ag/AgCl reference and a glassy carbon auxiliary electrode. FIG. 21B shows current density vs. scan rate plot from the cyclic voltammogram in FIG. 21A.

Figure 25:
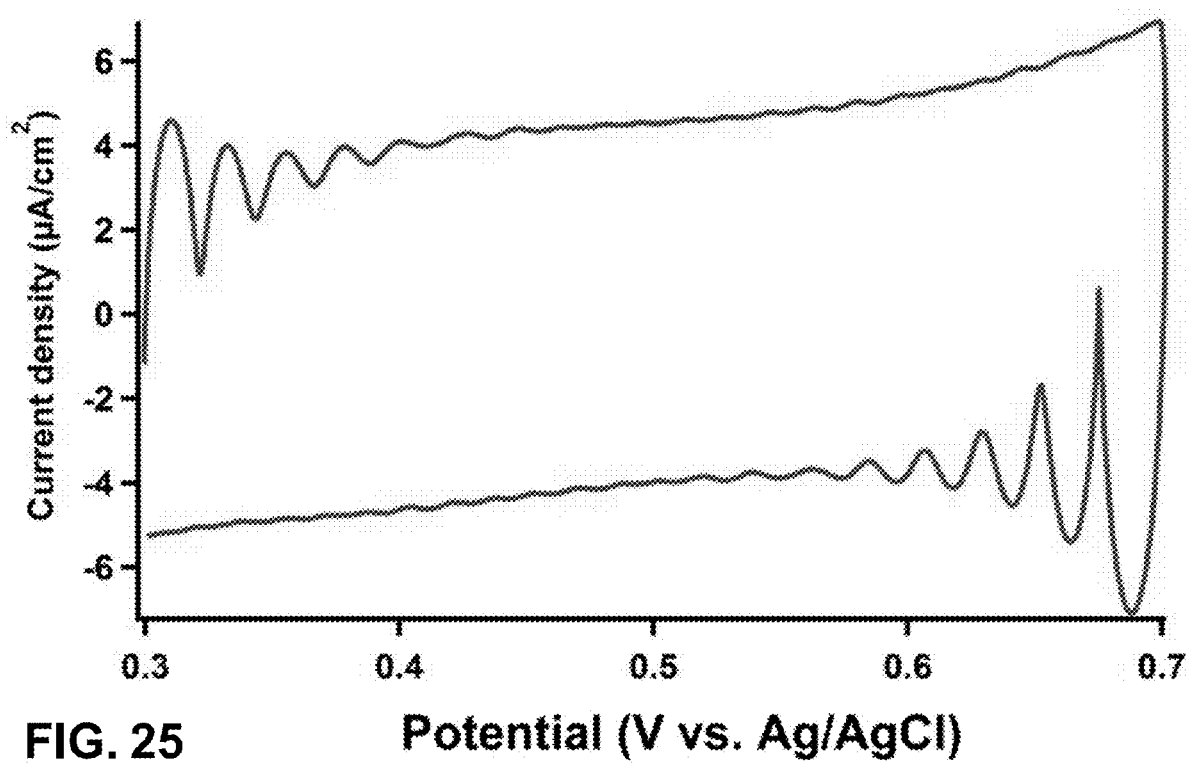

FIG. 25 shows a cyclic voltammogram of an Au foil after soaking in a 1 mM $CH_2Cl_2$ solution of 2 and rinsing with $CH_3CN$. The pyrene-functionalized monolayer is not present on the sample. The voltammogram was recorded in an aqueous 0.1 M $HClO_4$ solution. Potentials measured versus an Ag/AgCl reference electrode in 1 M KCl. The 1 cm² Au substrate was used as the working electrode and glassy carbon as the auxiliary electrode.

DESCRIPTION OF PREFERRED EMBODIMENTS

As known to one of ordinary skill in the art, a "polycyclic aromatic hydrocarbon", abbreviated PAH, and alternatively referred to as "polyaromatic", is defined is an organic compound containing multiple unsubstituted benzene rings. Examples of polyaromatic compounds include, but are not limited to, pyrene, coronene, and anthracene.

As used herein, the term "polyaromatic derivative" is defined as a polyaromatic molecule having an available reactive functional group.

As used herein, the term "molecular analyte" is defined as a molecular species that is being modified onto the electrode surface. Examples of molecular analytes include, but are not limited to, ferrocene, molecular catalysts and electrocatalysts, electrochromic compounds, and receptors for chemical and biological sensing.

Figure 1:
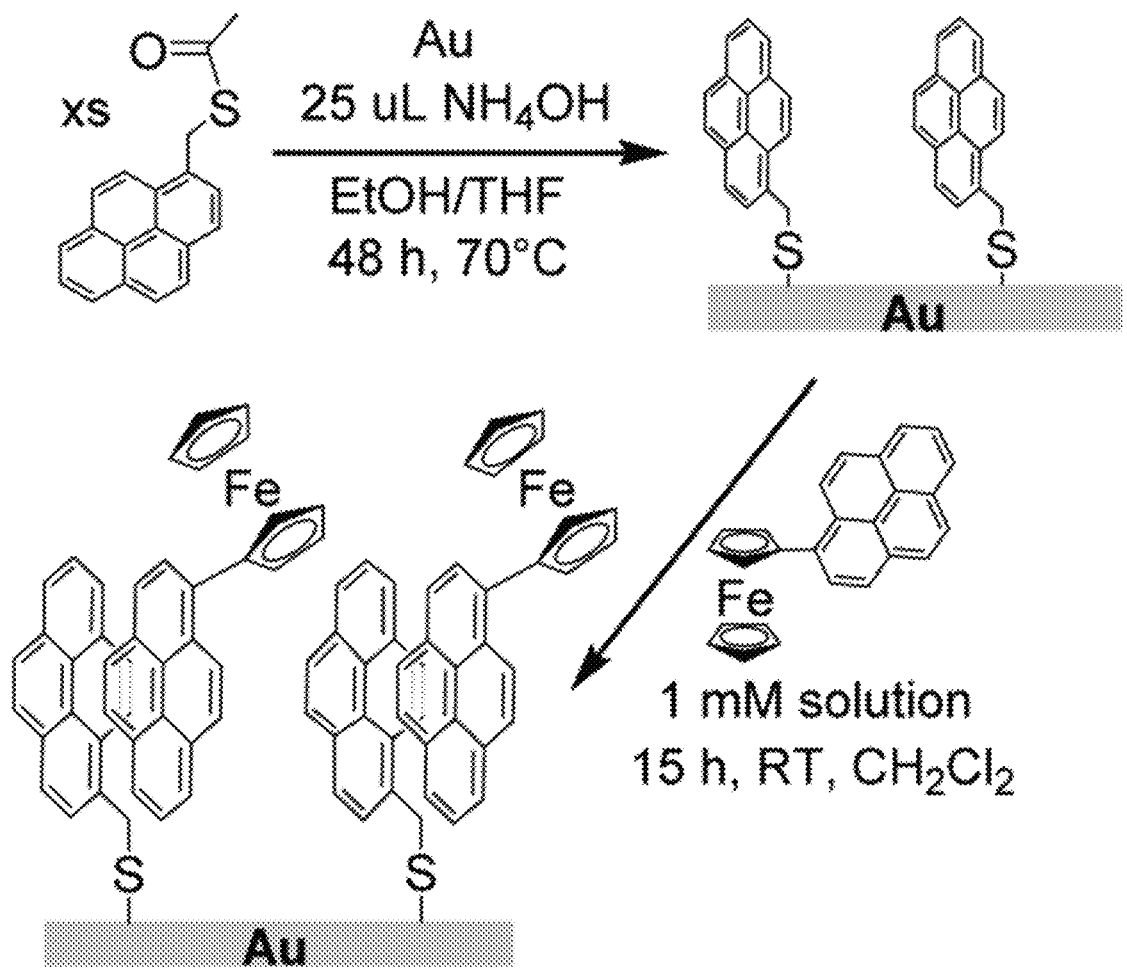
FIG. 1 shows an exemplary schematic of extending non-covalent attachment of molecular complexes onto non-carbon electrodes by pre-functionalizing the surface with covalently bound pyrene.
Figure 2A:
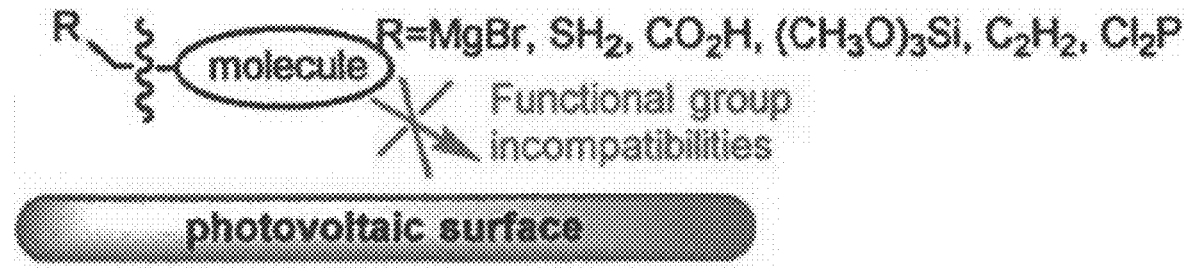
FIG. 2A shows a non-limiting example of molecular species that do not covalently attach onto surfaces due to functional group incompatibility. Existing procedures are synthetically challenging, and complexes often lose their desirable properties
Figure 2B:
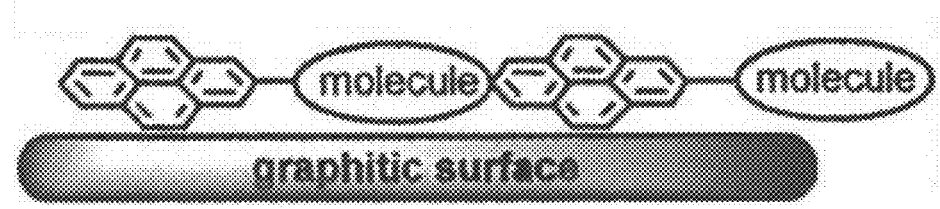
FIG. 2B shows a non-limiting example of pyrene-functionalized molecular species attaching onto graphitic surfaces. However, said procedure can only be applied to graphitic electrode surfaces.
Figure 2C:
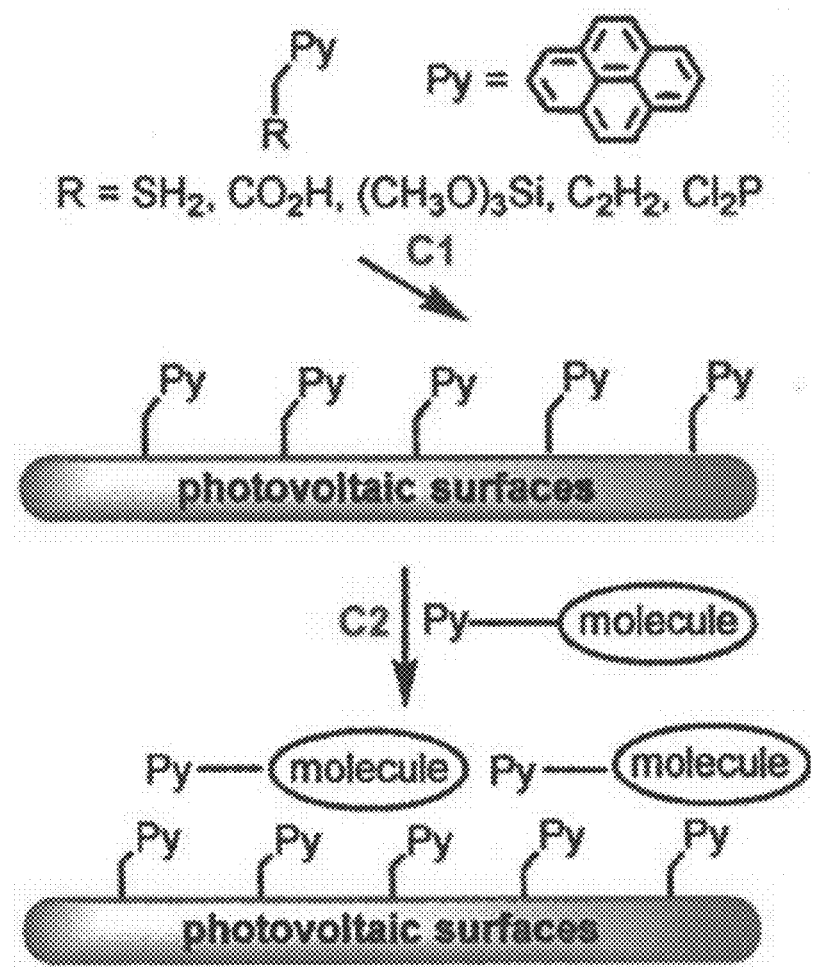
FIG. 2C illustrates a non-limiting example of the present invention in which molecular species are successfully integrated onto surfaces. Step C1 is the covalent attachment of a pyrene monolayer onto the surface. Pyrene is simple to functionalize, and can protect the surface against corrosion. In step C2, pyrene-modified molecular species are physisorbed onto pyrene-functionalized surfaces. Aromatic stacking interactions can facilitate electron transfer.
Figure 3:
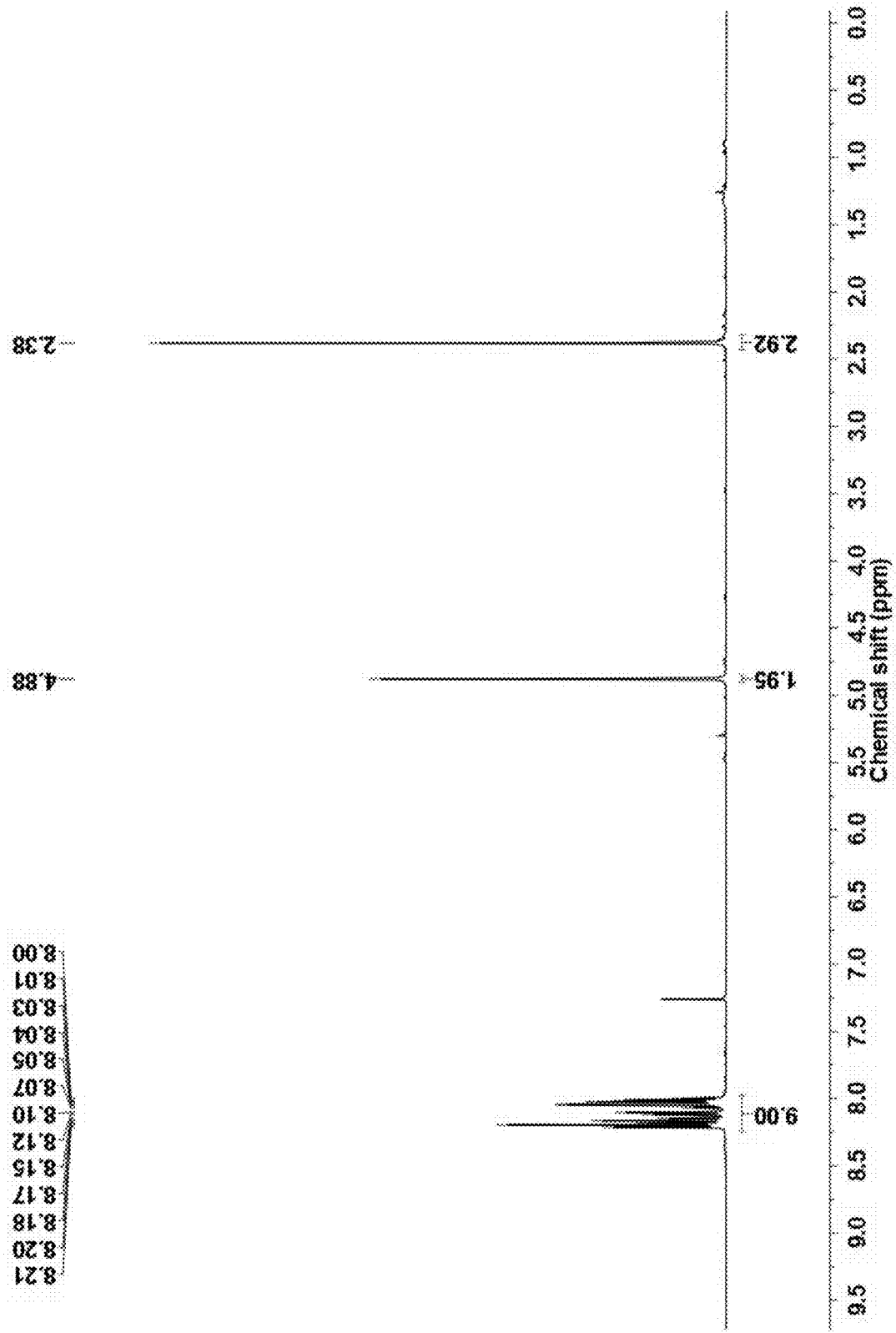
FIG. 3 shows a $^1$H NMR spectrum of S-(pyren-1-ylmethyl) ethanethioate (1) in $CDCl_3$.
Figure 4:
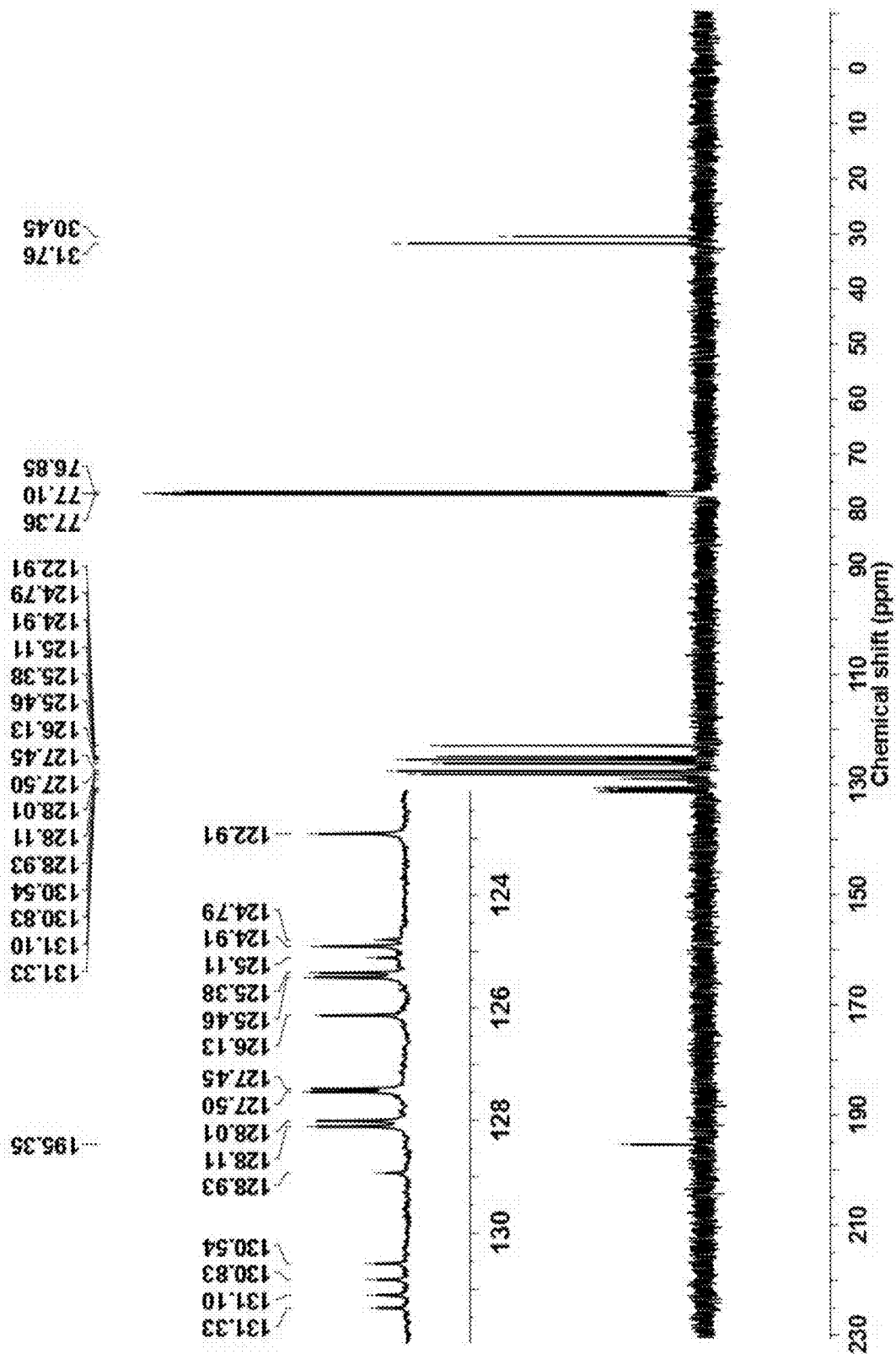
FIG. 4 shows a $^{13}$C NMR spectrum of 1 in $CDCl_3$.
Figure 5:
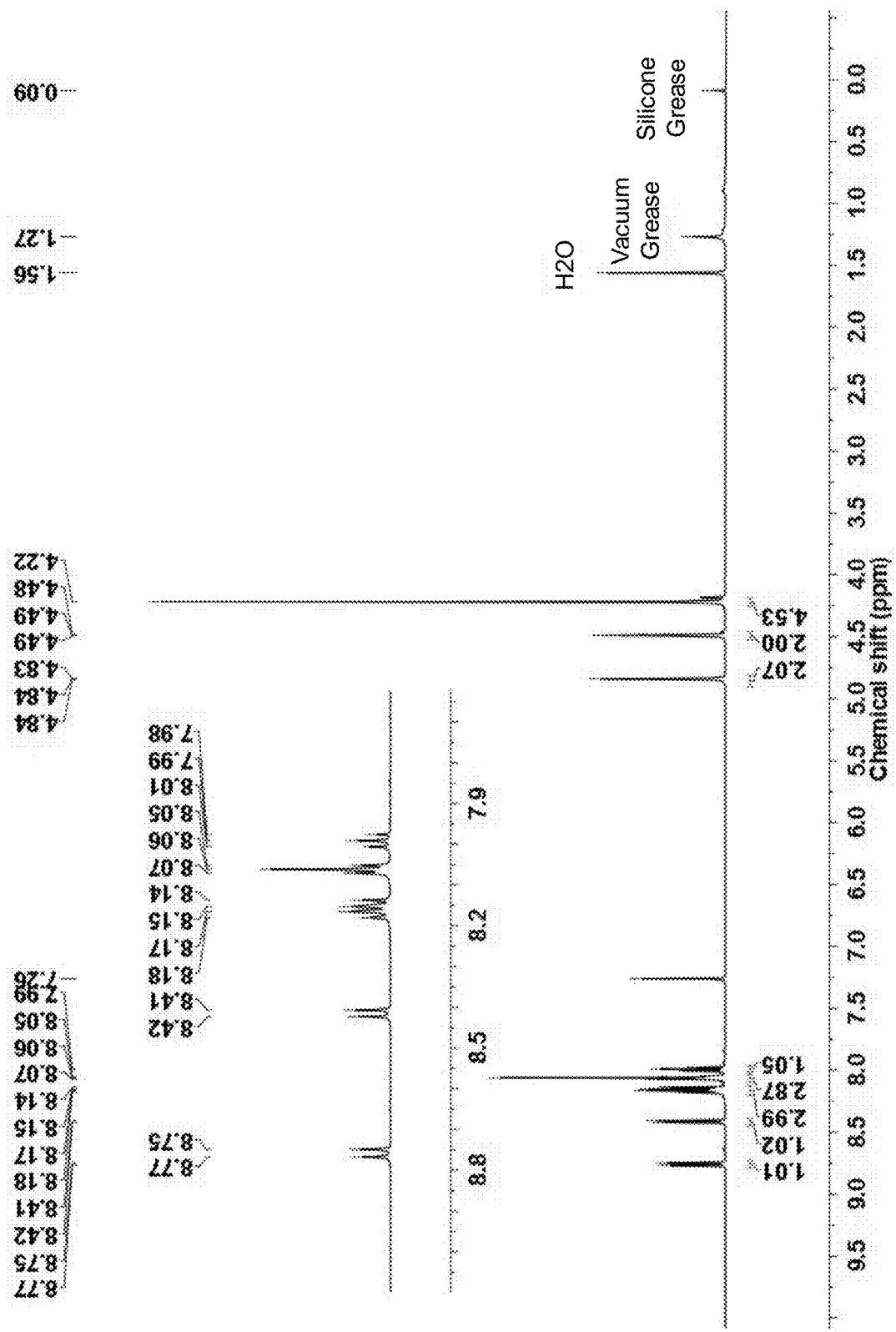
FIG. 5 shows a $^1$H NMR spectrum of 1-pyrenylferrocene (2) in $CDCl_3$.
Figure 6:
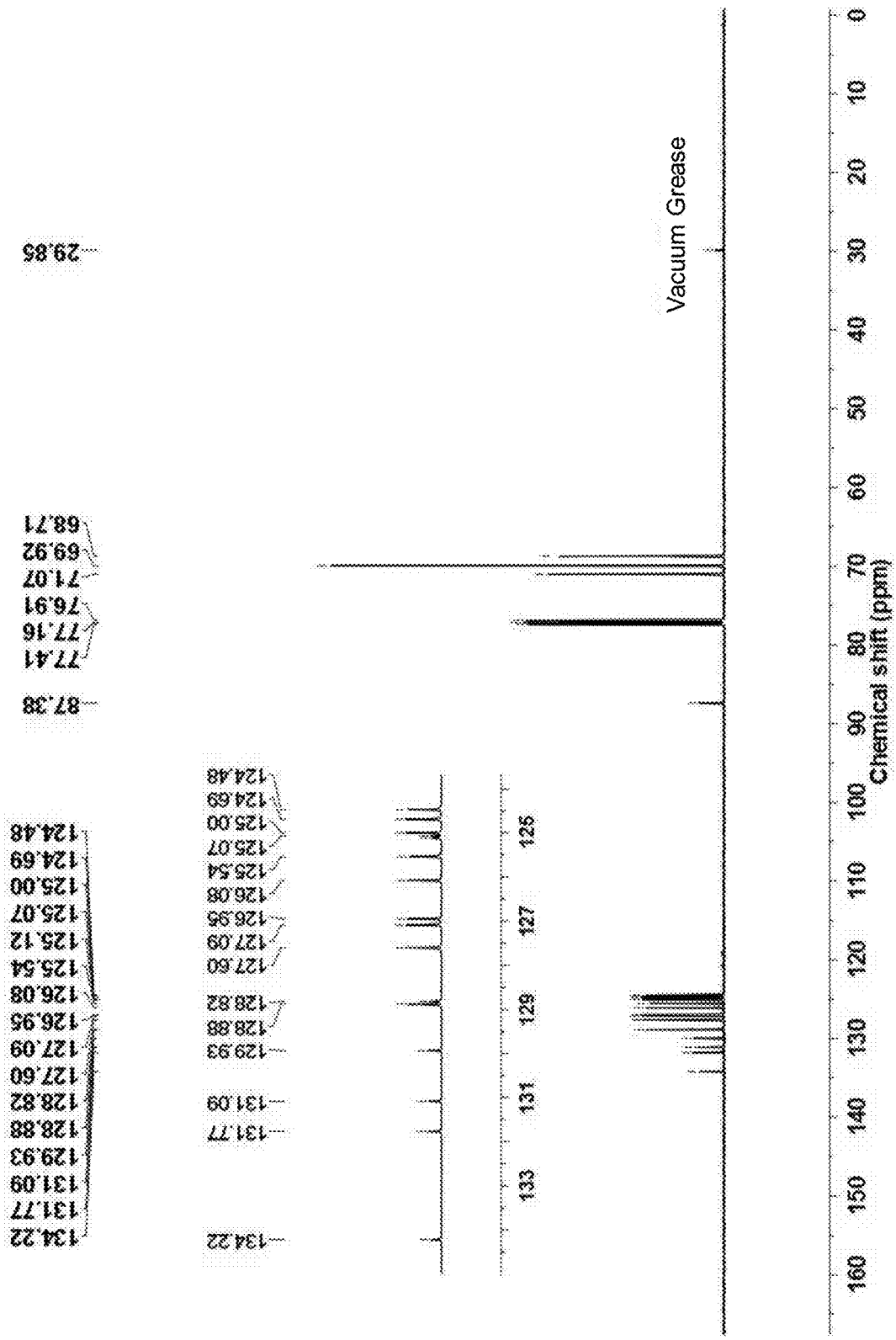
FIG. 6 shows a $^{13}$C NMR spectrum of 2 in $CDCl_3$.

Referring now to FIGS. 1-25, in one embodiment, the present invention features a method of extending non-covalent attachment of molecular complexes onto non-carbon electrodes by pre-functionalizing the surface with covalently bound polyaromatics, as shown in FIG. 1. The relatively unreactive nature of polyaromatics results in synthetically accessible derivatives that can be used to form covalent bonds to a variety of surfaces. A polyaromatic-functionalized molecular complex is then physisorbed onto the surface through π-interactions.

Without wishing to limit the invention to a particular theory or mechanism, this approach towards chemically modifying a surface requires covalent attachment of polyaromatics to the target surface, which is generally facile because of the inert nature of the polyaromatic and ease of installing a wide variety of functional groups. More significantly, this method permits modification of surfaces with molecular analytes functionalized with a polyaromatic, which are synthetically more accessible than molecules functionalized by many of the reactive functional groups traditionally used to form covalent bonds at the surface. Further still, the method described herein extends the utility of non-covalent attachment of molecular complexes functionalized with polyaromatics to modify non-carbon based and alternative electrode surfaces.

Without wishing to limit the invention to any theory or mechanism, this method represents a more benign route to functionalize electrodes with sensitive molecular complexes, effectively expanding the scope of molecular species that can be used to modify non-carbon surfaces. This approach would be generally useful for the broad range applications for chemically modified electrodes in chemical sensing, energy conversion and storage, molecular electronics, and electrochromic materials.

An embodiment of the present invention features a method of modifying a surface of an electrode substrate. The method may comprise providing the electrode substrate, depositing a layer of a polyaromatic derivative on the surface of the electrode substrate, thereby forming a polyaromatic-functionalized electrode surface, depositing a molecular analyte complex on the polyaromatic-functionalized electrode surface, thereby forming a surface-modified electrode substrate. Without wishing to limit the invention to a particular theory or mechanism, the method may be effective for protecting the surface of the electrode substrate from corrosion.

In preferred embodiments, the polyaromatic derivative comprises a polyaromatic compound having a reactive functional group. In some embodiments, the polyaromatic compounds that may be used with the present invention include, but are not limited to, pyrene, anthracene, and coronene.

Examples of said reactive functional groups include, but are not limited to, SH, $CO_2H$, $(CH_3O)_3Si$, $C_2H_2$, MgBr, $PO_3H_2$, or $Cl_2P$. Without wishing to limit the invention to a particular theory or mechanism, the reactive functional group of the polyaromatic derivative can covalently bind to the surface of the electrode.

In one embodiment, the molecular analyte complex may comprise a molecular analyte functionalized with a polyaromatic moiety, such as, for example, a pyrene, an anthracene, or a coronene. Without wishing to limit the invention to a particular theory or mechanism, the molecular analyte complex can attach to the polyaromatic-functionalized electrode surface via π-interactions between the polyaromatic moiety of the molecular analyte complex and a polyaromatic moiety of the polyaromatic derivative.

In some embodiments, the polyaromatic moiety of the molecular analyte complex may be of the same or different species as the polyaromatic moiety of the polyaromatic derivative. For instance, the polyaromatic moiety of the molecular analyte complex and the polyaromatic moiety of the polyaromatic derivative may both be a pyrene. Alternatively, the polyaromatic moiety of the molecular analyte complex may be a pyrene, whereas the polyaromatic moiety of the polyaromatic derivative may be an anthracene. The invention is not limited to these examples, and any combination of polyaromatic moieties may be used when practicing the invention.

In other embodiments, the surface of the electrode substrate may be constructed from a non-carbon based material. Non-limiting examples thereof include gold materials, indium tin oxide materials, and gallium phosphide materials. In further embodiments, the surface-modified electrode substrate may be a positive electrode or negative electrode.

According to one embodiment, the step of depositing the layer of the polyaromatic derivative on the surface of the electrode substrate may comprise preparing a solution of the polyaromatic derivative and then adding the electrode substrate to the polyaromatic derivative solution. The reactive functional group of the polyaromatic derivative covalently binds to the surface of the electrode to form the polyaromatic derivative layer on the surface of the electrode substrate. This layer may be referred to as a self-assembled (i.e. spontaneous arrangement) monolayer (SAM). In some embodiments, the solution may be heated to facilitate layering process. The electrode substrate is then removed from the polyaromatic derivative solution. The process results in the surface of the electrode substrate being substantially covered by the polyaromatic derivative layer. For example, the polyaromatic derivative layer covers at least 50% of the surface. In a preferred embodiment, the polyaromatic derivative layer covers about 50% to 80% of the surface. In a more preferred embodiment, the polyaromatic derivative layer covers about 80% to 100% of the surface.

According to another embodiment, the step of depositing the molecular analyte complex on the polyaromatic-functionalized electrode surface comprises preparing a solution of the molecular analyte complex, and then adding the electrode substrate having the polyaromatic-functionalized electrode surface to the molecular analyte complex solution. The molecular analyte complex can attach to the polyaromatic-functionalized electrode surface via the π-interactions between the polyaromatic moieties, thereby forming the surface-modified electrode substrate. In some embodiments, the electrode is allowed to remain in the solution of the molecular analyte complex for a period of time. For instance, the electrode may soak in the solution for a period of 24-48 hours. The surface-modified electrode substrate is then removed from the molecular analyte complex solution.

In one embodiment, the solution of the molecular analyte complex contains a sufficient concentration of the molecular analyte complex to ensure that a molecular analyte complex attaches to each polyaromatic moiety of the polyaromatic derivative. In some embodiments, at least 50% of the polyaromatic moieties in the polyaromatic derivative have a molecular analyte complex attached thereto. In preferred embodiments, about 50%-80% of the polyaromatic moieties in the polyaromatic derivative have a molecular analyte complex attached thereto. In more preferred embodiments, about 80%-100% of the polyaromatic moieties in the polyaromatic derivative have a molecular analyte complex attached thereto.

In yet another embodiment, the present invention features a two-part surface modification agent for an electrode substrate. The surface modification agent may comprise a polyaromatic derivative having a reactive functional group that is configured to covalently binding to a surface of the electrode substrate, and a molecular analyte complex comprising a molecular analyte functionalized with a polyaromatic moiety. Without wishing to limit the invention to a particular theory or mechanism, the molecular analyte complex is configured to attach to the polyaromatic derivative via π-interactions between the polyaromatic moiety of the molecular analyte complex and a polyaromatic moiety of the polyaromatic derivative. Further still, it is believed that the two-part surface modification agent is effective for protecting the surface of the electrode substrate from corrosion.

In some embodiments, the polyaromatic moiety of the molecular analyte complex may be any of the known PAH compounds, such as pyrene, coronene, or anthracene. In other embodiments, the polyaromatic moiety of the polyaromatic derivative may also be any of the known PAH compounds. As previously exemplified, the polyaromatic moiety of the molecular analyte complex may be the same as, or different from, the polyaromatic moiety of the polyaromatic derivative. In still other embodiments, non-limiting examples of the reactive functional groups include SH, $CO_2H$, $(CH_3O)_3Si$, MgBr, $PO_3H_2$, or $Cl_2P$.

In preferred embodiments, the two-part surface modification agent may be used to modify the surface of any electrode to produce a surface-modified electrode. In one embodiment, the surface-modified electrode may comprise a conductive substrate, and a surface modifying layer disposed on a surface of the conductive substrate. The surface modifying layer may comprise any of the two-part surface modification agents described herein. Preferably, the surface modifying layer is effective for protecting the surface of the conductive substrate from corrosion. In some embodiments, the surface of the conductive substrate is constructed from a non-carbon material, such as, for example, a gold material, an indium tin oxide material, or a gallium phosphide material. Said non-carbon material may be constructed from any suitable material, and is not limited to the aforementioned examples.

Any of the surface-modified electrodes described herein can be made to be a positive electrode, or alternatively, a negative electrode. In some preferred embodiments, the surface-modified electrodes may be used for electrochemical devices. Examples of said electrochemical devices include, but are not limited to, photoelectrochemical cells, electrochemical cells, sensors, and electrochromic devices.

EXPERIMENTAL

To demonstrate the feasibility, stability, and facile electron transfer of this new method of surface modification, a pyrene monolayer was established on a gold foil electrode. A pyrene-functionalized ferrocene with well-defined redox properties was used to interrogate physisorption and electron transfer at the interface. The studies confirm that covalently bound pyrene can sufficiently alter the surface properties of the electrode to allow physisorption and electron transfer to pyrene-functionalized molecular complexes.

The following are non-limiting examples of practicing the present invention. The examples are for illustrative purposes only and are not intended to limit the invention in any way. Equivalents or substitutes are within the scope of the invention.

General Experimental Procedures $^1$H NMR spectra were recorded on a Bruker CRYO500 (500 MHz) spectrometer at 20° C. All $^1$H chemical shifts have been internally calibrated to the monoprotio impurity of the deuterated solvent. $^{13}$C NMR spectra were recorded on a Bruker CRYO500 (126 MHz) at 20° C.

All electrochemical experiments were carried out in air in 0.1 M perchloric acid solutions unless otherwise noted. Cyclic voltammetry experiments were performed with a Pine Wavedriver 10 potentiostat using Aftermath software. All potentials are referenced to Ag/AgCl unless otherwise noted. Electrospray ionization (ESI) mass spectra were collected using an ESI LC-TOF Micromass LCT. High resolution mass spectra were obtained from a Waters (Micromass) LCT premier #1.

Fourier transform infrared (FTIR) surface spectra of the gold electrodes and S-(pyren-1-ylmethyl) ethanethioate (1) were collected on a Jasco FTIR-4700-ATR-PRO ONE in air. FTIR of molecular 1-pyrenylferrocene (2) was recorded on a Thermo Scientific Nicolet iS5 spectrometer with an iD5 ATR attachment in a nitrogen filled glovebox. Samples were prepared by evaporating a dichloromethane solution of the sample onto the ATR crystal.

X-ray photoelectron spectra were acquired with a Kratos Analytical AXIS Supra spectrometer utilizing monochromatic Al Kα radiation (1486.7 eV, 250 W) under ultra-high vacuum (UHV) conditions (~$10^{-9}$ torr). The binding energies were referred to the Au $4f_{7/2}$ signal at 84.0 eV. Survey scans were used for elemental composition of the gold surface to demonstrate purity while high resolution region scans provided information on chemical shifts and position of peaks for specific elements. Spectral data was analyzed using Computer Aided Surface Analysis for X-ray Photoelectron Spectroscopy (CasaXPS). Shirley or linear backgrounds were used and Gaussian-Lorentzian lineshapes were used to model peaks. An offset Shirley background was required only for the Fe 2p XP spectrum shown in FIG. 12A.

Synthesis and Materials

All reactions and manipulations were performed under a nitrogen atmosphere using standard Schlenk techniques or a Vacuum Atmospheres glovebox unless otherwise indicated. Gold foil, 0.01 mm thickness, 99.9% pure, was purchased from Goodfellow. Solvents, with the exception of isopropanol and methanol, were dried using an activated alumina column. Water was purified by a Barnstead NANOpure ultrapure water system. All glassware was cleaned by immersion in concentrated chromic acid solution prepared using a literature procedure. Sonication was performed in a SPER scientific ultrasonic cleaner (42 MHz). 1-(bromomethyl)pyrene was prepared according to the procedure taught in J. L. Bartels, P. Lu, A. Walker, K. Maurer and K. D. Moeller, *Chem. Commun.*, 2009, DOI: 10.1039/B910577H, 5573-5575, the contents of which are incorporated herein by reference in their entirety. All other chemicals were purchased and used without further purification.

Synthesis of Molecular Precursors

S-(pyren-1-ylmethyl) ethanethioate (1)

1-bromomethylpyrene (295 mg, 1.00 mmol) was added to a vial with acetone (20 mL), forming a red suspension upon stirring. After addition of potassium thioacetate (137 mg, 1.20 mmol) in two portions, the suspension turned yellow. The resulting mixture was stirred for two days before the solvent was removed in vacuo. The solid was redissolved in dichoromethane and filtered through celite to remove a white solid impurity. The solvent was removed from the filtrate to furnish a light red solid, which was washed with pentane in order to isolate the light peach product (232 mg, 0.800 mmol, 80% yield). $^1$H NMR (500 MHz, CDCl$_3$): δ=2.38 (s, 3H, —CH$_3$), 4.88 (s, 2H, —CH$_2$—), 8.00-8.21 (m, 9H, Pyr-H). $^{13}$C NMR (126 MHz, CDCl$_3$): δ=30.45, 31.76, 122.91, 124.79, 124.91, 125.11, 125.38, 125.46, 126.13, 127.45, 127.50, 128.01, 128.11, 128.93, 130.54, 130.83, 131.10, 131.33, 195.35. HR-MS: m/z calc. for [C$_{19}$H$_{14}$OS]Na$^+$: 313.0660; found: 313.0663.

1-pyrenylferrocene (2)

Ferroceneboronic acid (100 mg, 0.435 mmol), 1-bromopyrene (120 mg, 0.427 mmol), and Pd(dppf)Cl$_2$.CH$_2$Cl$_2$ (32 mg, 0.044 mmol, 10 mol %) (dppf=1,1'-Bis(diphenylphosphino)ferrocene) were added to dimethoxyethane (8 mL) in a Schlenk tube charged with a stirbar. NaOH (1.2 g, 30 mmol) was added to the flask in H$_2$O (2 mL) to make a 10 mL, 3 M solution. The tube was sealed and heated at 85° C. in an oil bath for 5 days. Dichloromethane was added to the resulting brown sludge, which was filtered through a silica plug to remove the residual catalyst and water. The resulting mixture was purified by column chromatography using n-hexane as the eluent, and the second fraction (red) was collected and the solvent removed in vacuo. The resulting solid was washed in cold n-hexane to yield the pure 1-pyrenylferrocene as a red/orange solid (30 mg, 0.08 mmol, 20% yield). $^1$H NMR (500 MHz, CDCl$_3$): δ=4.22 (s, 5H, C$_5$H$_5$), 4.49 (t, 2H, Cp-H), 4.84 (t, 2H, Cp-H), 7.99 (t, 1H, Pyr-H), 8.06 (t, 3H, Pyr-H), 8.16 (qd, 3H, Pyr-H), 8.41 (d, 1H, Pyr-H), 8.76 (d, 1H, Pyr-H). $^{13}$C NMR (126 MHz, CDCl$_3$): δ=68.71, 69.92, 71.07, 87.38, 124.48, 124.69, 125.00, 125.07, 125.12, 125.54, 126.08, 126.95, 127.09, 127.60, 128.82, 128.88, 129.93, 131.09, 131.77, 134.22. HR-MS: m/z calc. for [C$_{26}$H$_{18}$Fe]: 386.0758; found: 386.0764.

Preparation of Chemically Modified Gold Electrodes

All glassware used in the following preparations were cleaned in a concentrated chromic acid bath solution (chromerge) for at least 1 hour and then rinsed thoroughly with water before being dried in an oven.

Gold substrate preparation.

In air, a square 1 cm$^2$ Au foil electrode was cleaned by electrochemical cycling between −0.3 V and 1.7 V in 1 M H$_2$SO$_4$. The foil was then boiled in nitric acid for 1 hour to remove organic residue and rinsed with water and electronic grade isopropanol (99.999%). The Au electrode was then sonicated for 15 minutes in water and re-rinsed with water and isopropanol.

Pyrene Chemisorbed Monolayer Formation.

Ethanol (2 mL) was added to S-(pyren-1-ylmethyl) ethanethioate (1) to make a suspension. Tetrahydrofuran was added drop-wise to the suspension until 1 was completely dissolved. The Au electrode was added to this solution along with 25 μL of 18 M aqueous NH$_4$OH. The sample heated to 70° C. under a nitrogen atmosphere for 48 hours. The Au electrode was then rinsed with dichloromethane and methanol before being dried in air under a stream of nitrogen.

Physisorption of Pyrene-Functionalized Ferrocene (2).

The pyrene functionalized Au electrodes were soaked in a 1 mM solution of 2 in dichloromethane (3 mL) for 48 hours. The Au was rinsed (5×2 mL) with acetonitrile and dried in vacuo for at least 1 hour before analysis.

Results

Synthesis

The thioacetate-functionalized pyrene (1) was synthesized for covalent attachment onto gold. Compound 1 was isolated by nucleophilic substitution of 1-bromomethylpyrene with potassium thioacetate and was characterized by $^1$H NMR (FIG. 3), $^{13}$C NMR (FIG. 4), and high resolution mass spectroscopy as previously. Thioacetate derivatives have greater stability than their thiol counterparts because they are not prone to oxidation to form disulfides or sulfoxides, making them easier to isolate and purify. The thioacetate was deprotected using a strong base (NH$_4$OH) in situ prior to forming a covalent attachment to the surface. The pyrene-functionalized ferrocene (2) was synthesized via a Pd catalysed cross-coupling reaction, also shown in FIG. 1, and was characterized by $^1$H NMR (FIG. 5), $^{13}$C NMR (FIG. 6), and high resolution mass spectrometry.

Electrode Surface Analysis by X-ray Photoelectron Spectroscopy

Figure 7:
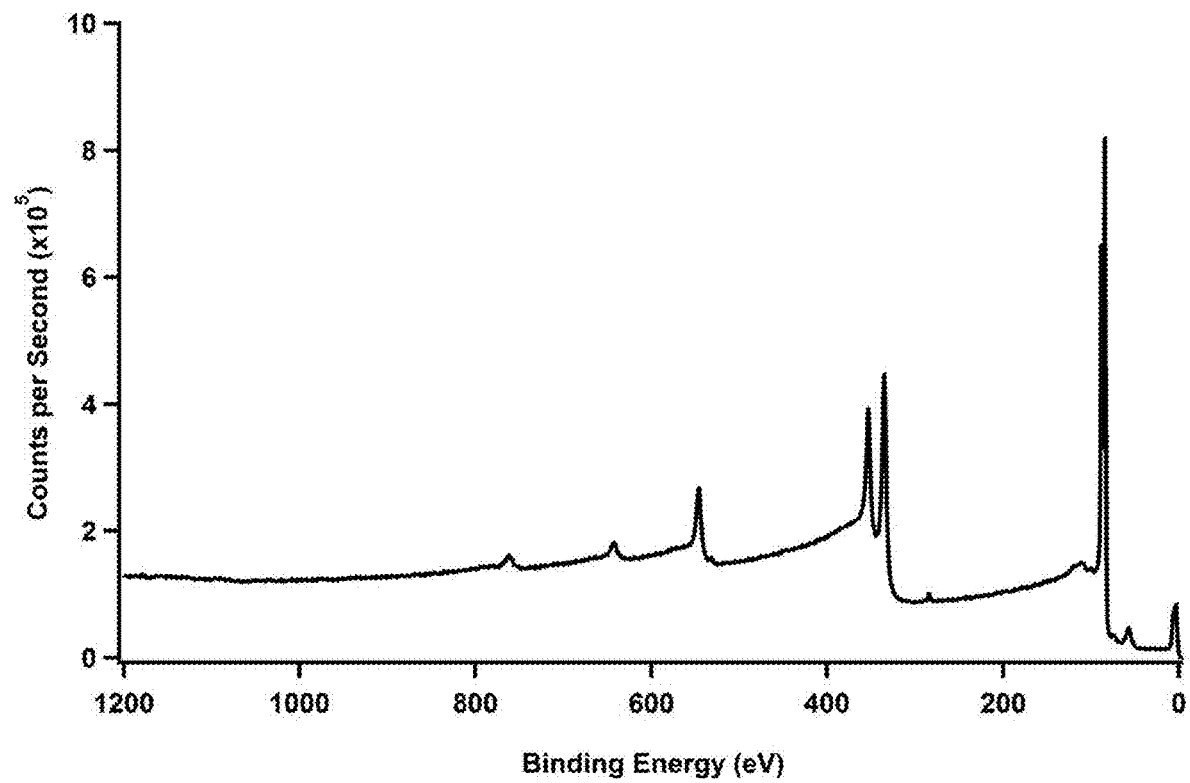
FIG. 7 shows a survey XP spectrum of clean gold.
Figure 8:
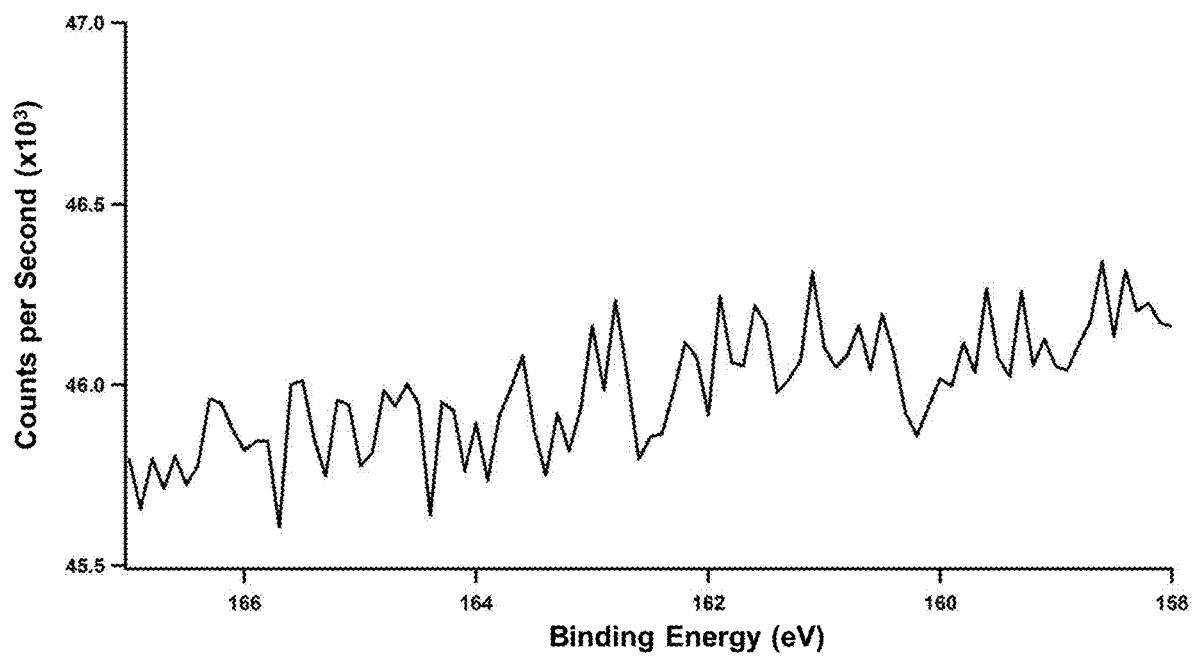
FIG. 8 shows an S 2p XP spectrum of clean gold.
Figure 9:
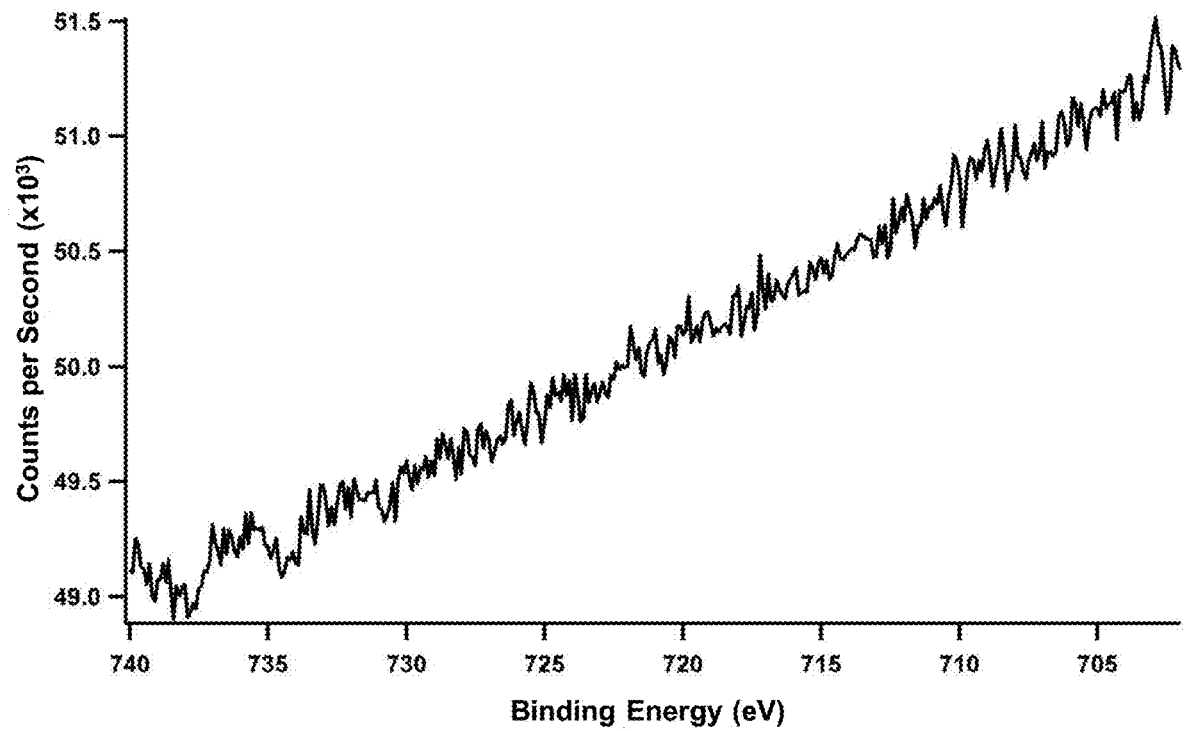
FIG. 9 shows a Fe 2p XP spectrum of clean gold.
Figure 10:
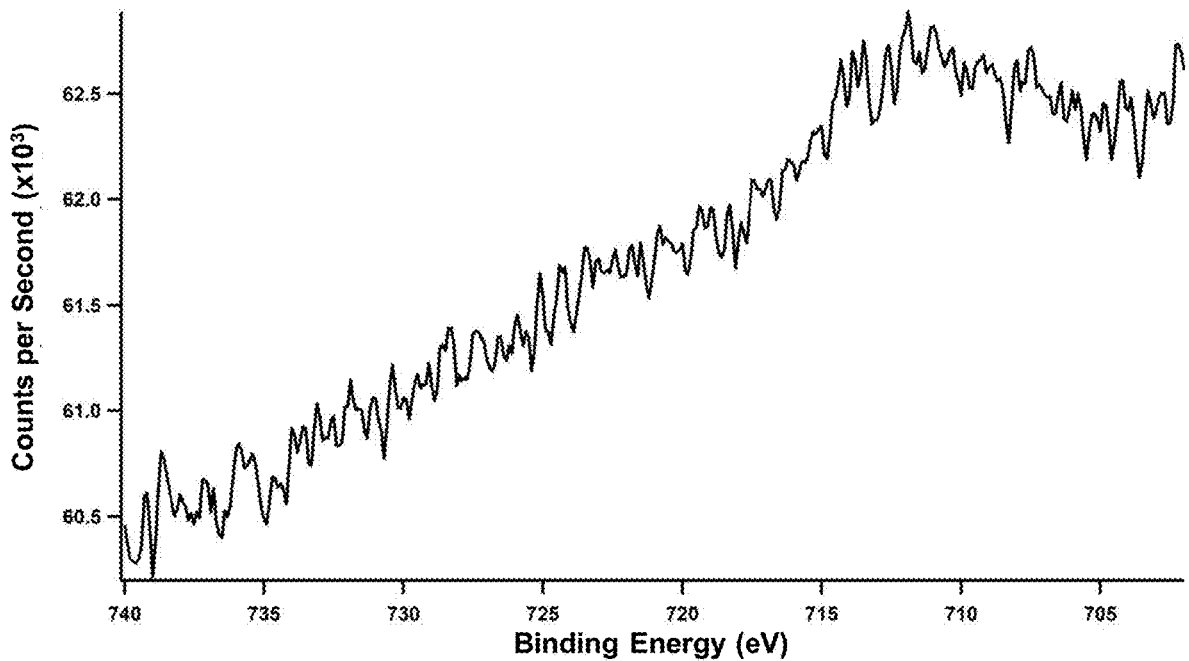
FIG. 10 shows a Fe 2p XP spectrum of gold upon covalent attachment of thiol-functionalized pyrene.
Figure 11:
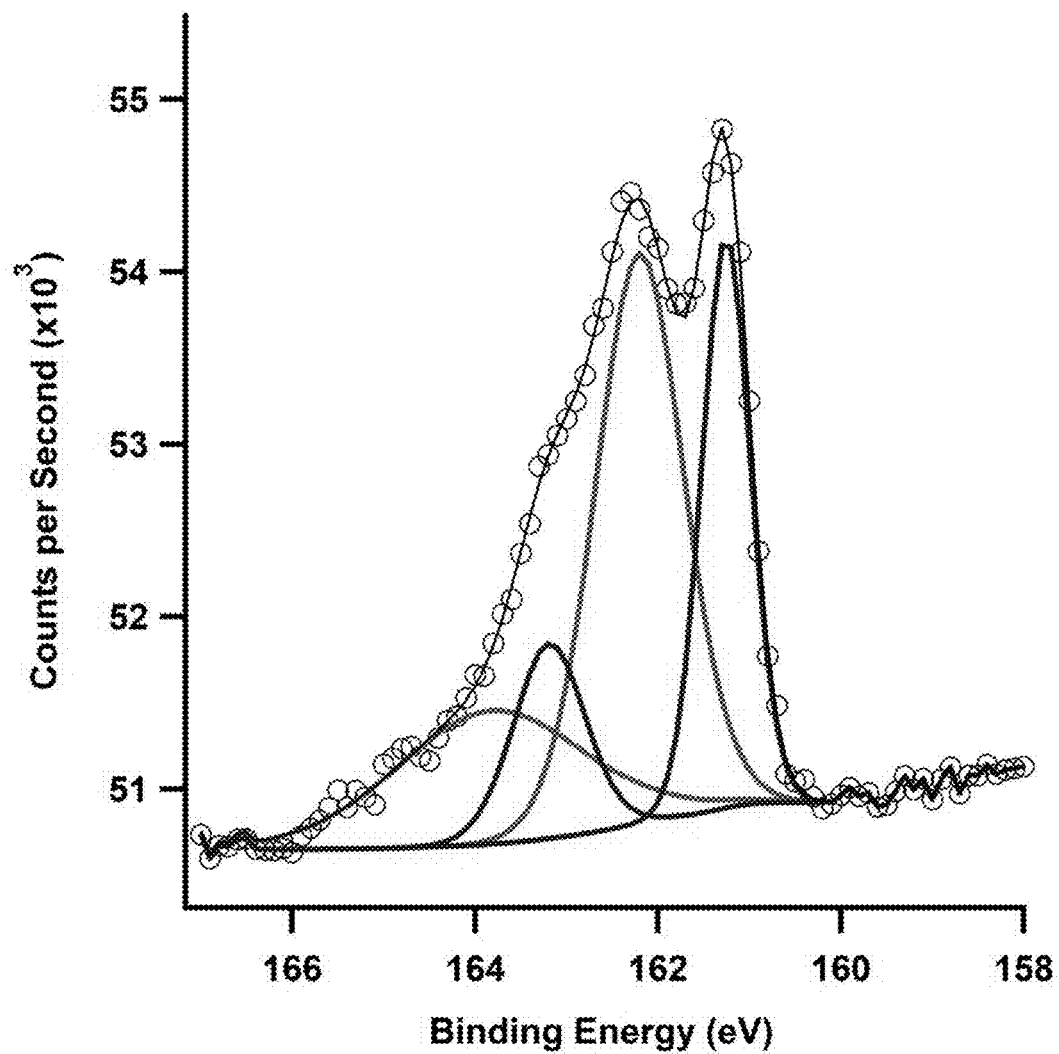
FIG. 11 shows an S 2p XP spectrum of gold upon covalent attachment of thiol-functionalized pyrene.

X-ray photoelectron spectroscopy was used to characterize the clean gold electrode surface (survey scan, FIG. 7). As expected, no peaks are observed in the S 2p (FIG. 8) and Fe 2p (FIG. 9) region. After covalent attachment of the thiol-functionalized pyrene, the XP spectra also showed no features in the Fe 2p (FIG. 10) region except a minor peak consistent with Fe(III) oxide, which may be attributed to trace impurities from the solvents used in sample preparation. Peaks in the S 2p (FIG. 11) region were consistent with thiol covalently bound to gold. These features are also observed after treatment with pyrene-functionalized ferrocene, and are described in more detail below.

Figure 12A:
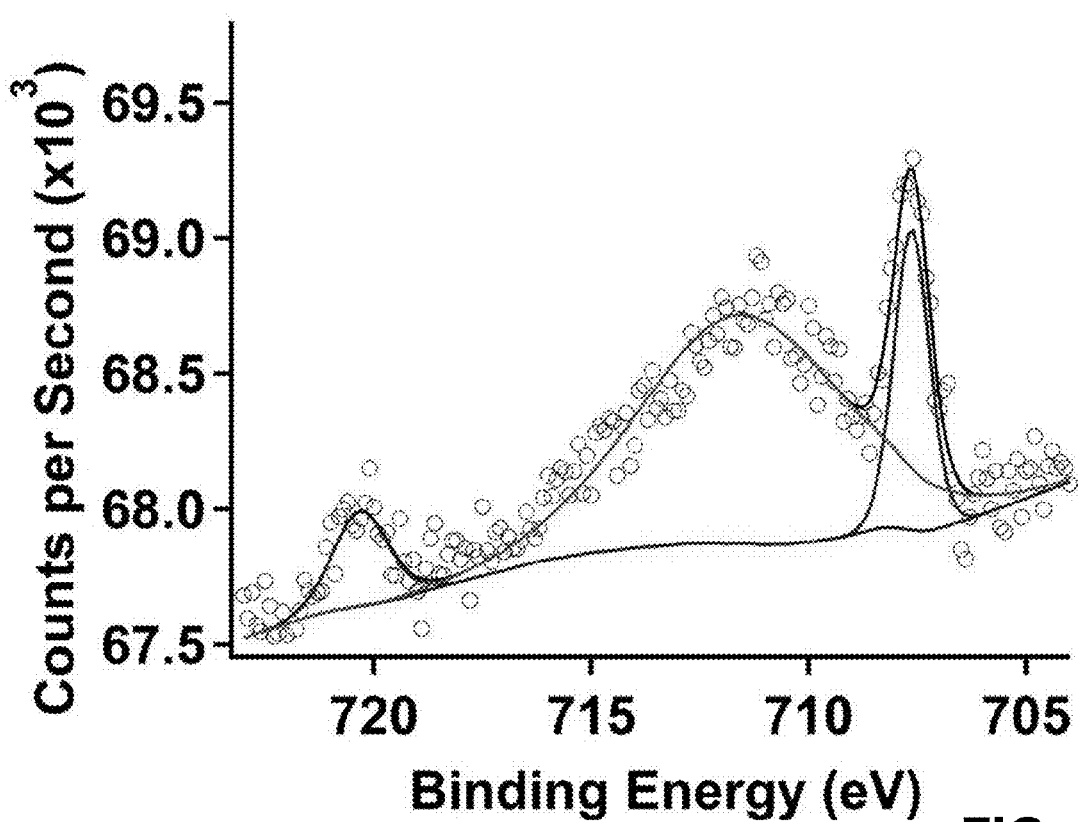
FIG. 12A shows a Fe 2p XP spectrum after covalent attachment with pyrene followed by treatment in a 1 mM solution of 2.
Figure 12B:
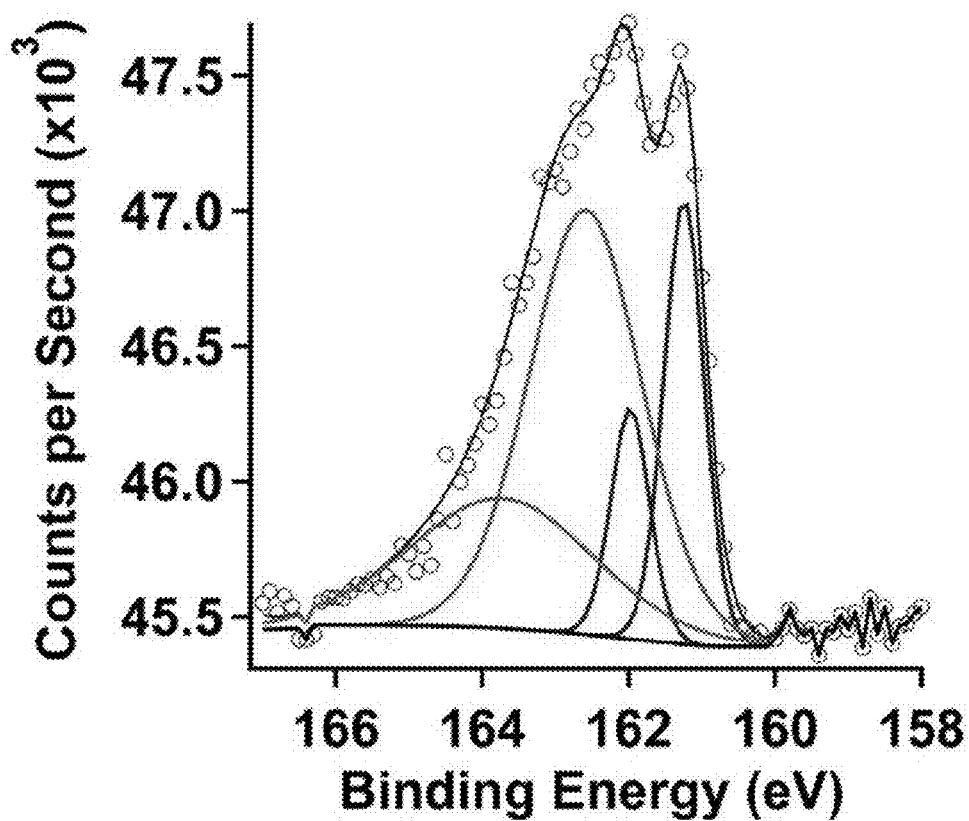
FIG. 12B shows an S 2p XP spectrum of a gold surface after covalent attachment with pyrene followed by treatment in a 1 mM solution of 2.

The gold substrate modified by covalent attachment of pyrene was then soaked in a solution of 2 in dichloromethane and rinsed with acetonitrile, a solvent in which 2 is also soluble. The XP spectra for the chemically modified electrode are shown in FIGS. 12A and 12B. The XP spectrum of the Fe 2p region in FIG. 12A displays two peaks at 707.6 and 720.3 eV, which correlate to the Fe 2p$_{3/2}$ and Fe 2p$_{1/2}$ emissions, respectively. These features are consistent with spectra taken of surfaces with covalently bound ferrocene. A broad third peak is seen at 711.6 eV, attributed to the impurity acquired during the monolayer formation process described above (FIG. 10)

The XP spectrum of the S 2p region is shown in FIG. 12B. A doublet in this spectrum was observed at binding energies of 161.2 and 162.2 eV. Modeling this doublet revealed two sets of doublets correlating to two different sulphur species. The doublet at binding energies of 162.2 eV and 163.4 eV, representing S $2p_{3/2}$ and $2p_{1/2}$ peaks respectively, and are consistent with sulphur species forming Au—S bonds. The lower intensity doublet at 161.2 eV appears at roughly half the concentration of the covalently-bound thiol described above. The lower intensity doublet does not correlate to peaks that would result from X-ray damage, unbound thiol, or a gold metal sulphide. Another low intensity peak at 168.6 eV (not shown) is apparent in all samples, and is attributed to a contaminant metal sulphate species that could not be removed from the surface through the cleaning methods described. However, the XPS data confirms that 1) the thiol-functionalized pyrene is covalently attached to the gold surface and 2) the pyrene-functionalized ferrocene is present on the surface.

Figure 13:
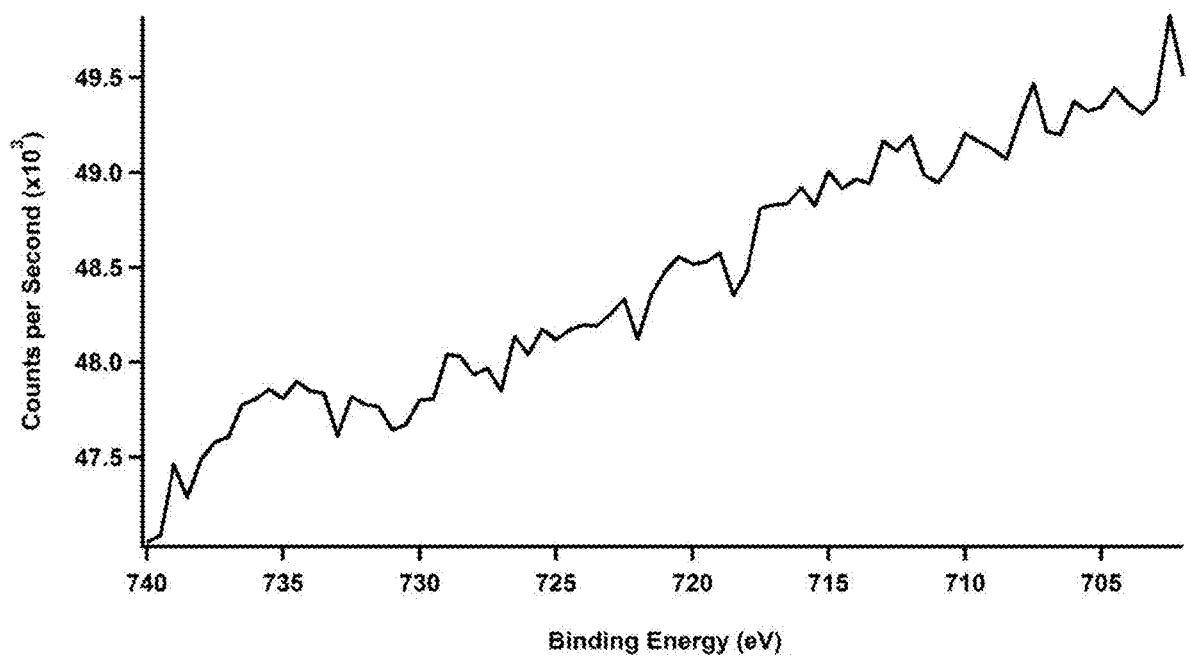
FIG. 13 shows a Fe 2p XP spectrum of clean gold treated with 2 and rinsed with $CH_3CN$. The pyrene modification to the surface is not present in this sample.

To confirm that physisorption of the pyrene-functionalized ferrocene is due to the presence of pyrene covalently attached to the gold surface, a clean gold electrode was also prepared and treated with 2 using the exact same procedure used in the prior experiment. As shown in FIG. 13, the XP spectrum of this sample did not show any peaks that correspond to iron, but instead matched the spectrum of the clean gold surface. The absence of 2 on the surface indicates that it is washed off of the surface after treatment when there is no pyrene covalently attached to the gold. In contrast, the interaction between the pyrene at the surface and the pyrene functionalized on the ferrocene is sufficient to maintain physisorption to the surface, even after the acetonitrile wash.

Electrode Surface Analysis by Infrared Spectroscopy

Figure 14:
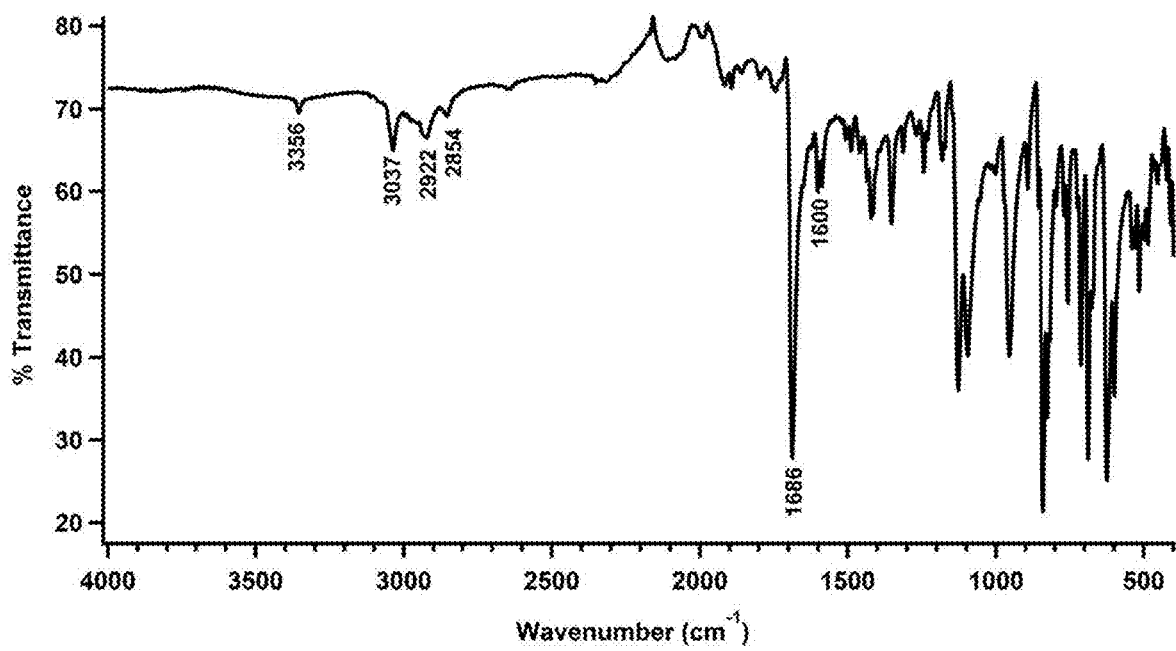
FIG. 14 shows a FTIR spectrum of 1.
Figure 15:
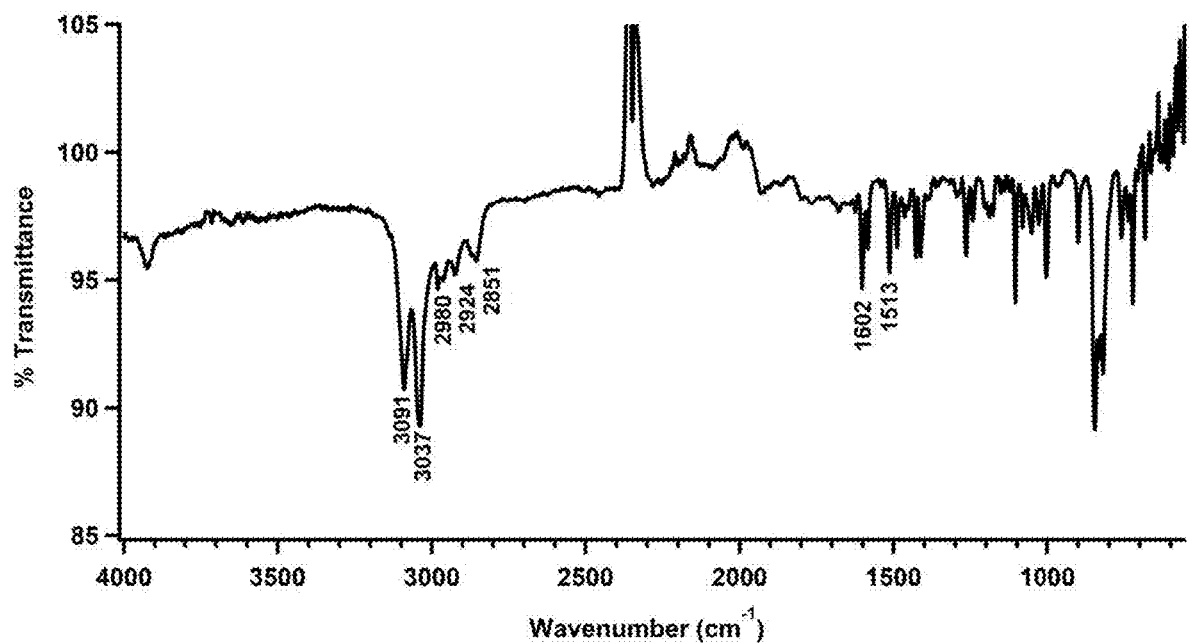
FIG. 15 shows a FTIR spectrum of 2.
Figure 16:
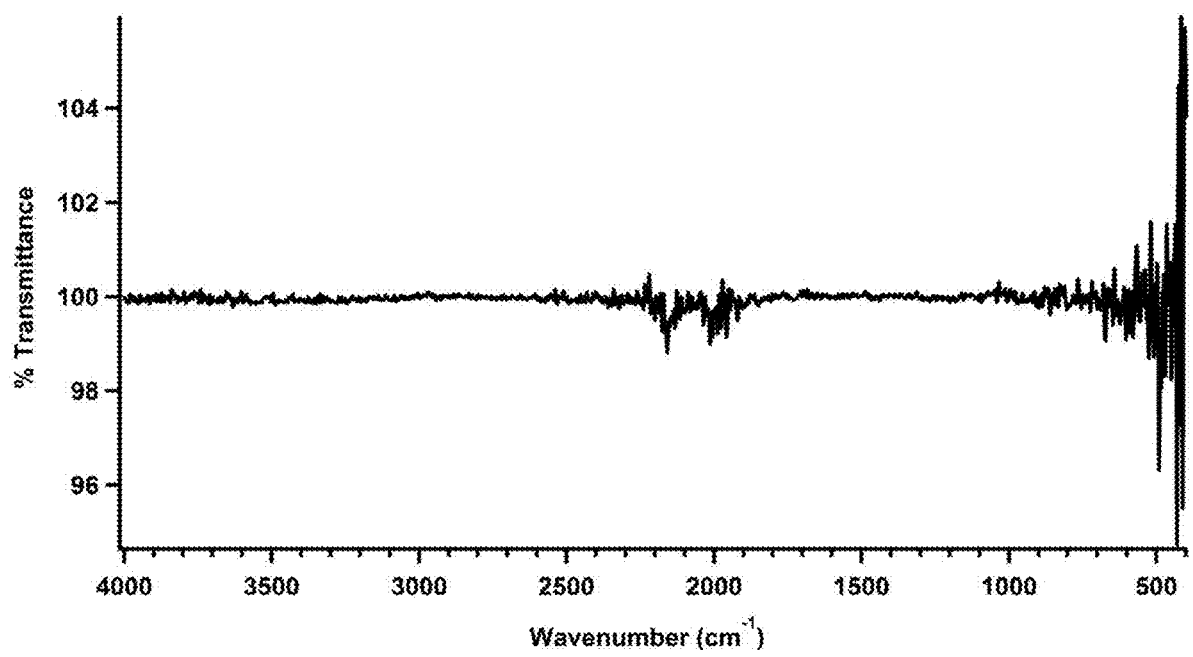
FIG. 16 shows a FTIR spectrum of a clean gold substrate using clean gold as a background.

ATR-FTIR measurements were used to characterize the modified gold electrodes. The infrared vibrational spectra for isolated 1 and 2 are shown in FIG. 14 and FIG. 15, respectively. The clean gold electrode (FIG. 16) did not show any significant vibrational stretches and was used as the background subtraction for subsequent measurements.

Figure 17:
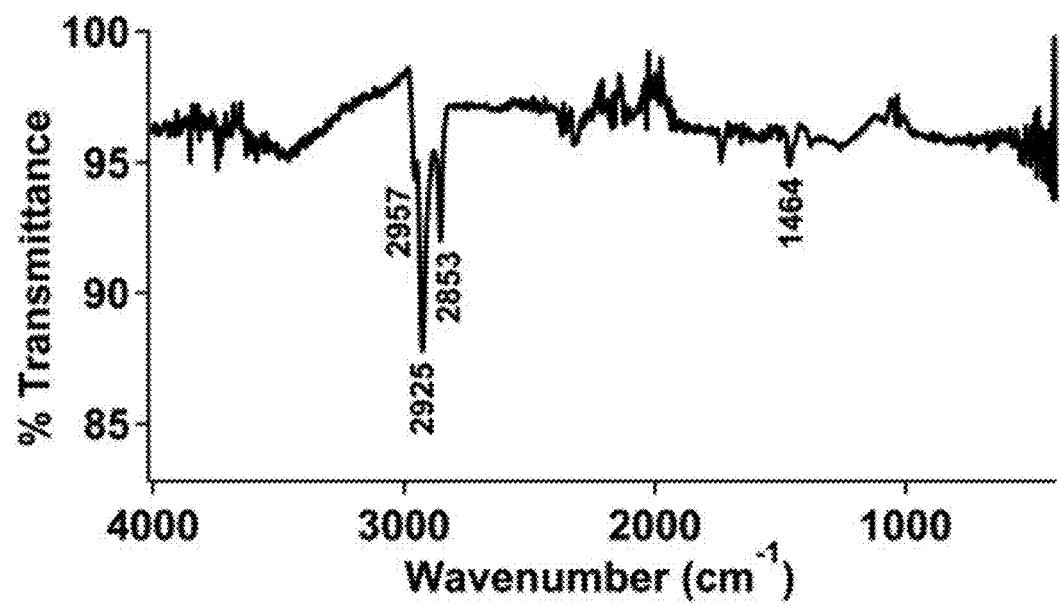
FIG. 17 shows a non-limiting example of an FTIR spectrum of a pyrene-modified gold electrode with the pyrene-functionalized ferrocene physisorbed to the surface.
Figure 18:
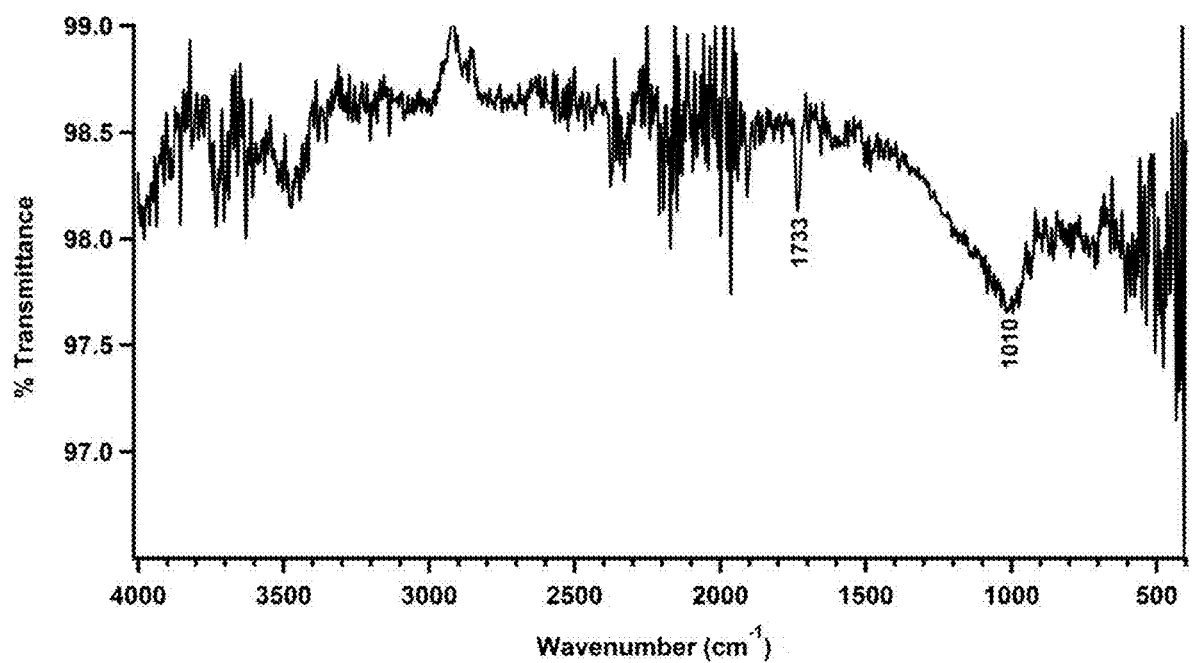
FIG. 18 shows a FTIR spectrum of a clean substrate after submersion in a 1 mM solution of 2 and rising with $CH_3CN$ using clean gold as a background.

As shown in FIG. 17, the infrared spectrum of the gold surface treated with thiol-functionalized pyrene followed by physisorption of the pyrene functionalized ferrocene (2) displayed peaks at 2925 and 2853 cm$^{-1}$, in the range of an aromatic C—H stretch as well as an sp$^3$ C—H stretch from the bound thiol.

A clean gold electrode prepared and treated with 2 using the same procedure described above was also examined. The infrared spectrum of this sample, shown in FIG. 18, did not show any significant absorption in the covalent organic region, but instead appeared very similar to the spectrum of a clean gold surface. Again, this supports that the covalently-bound pyrene facilitates physisorption of the pyrene-functionalized ferrocene.

Electrochemical Characterization of Modified Electrodes

Figure 19:
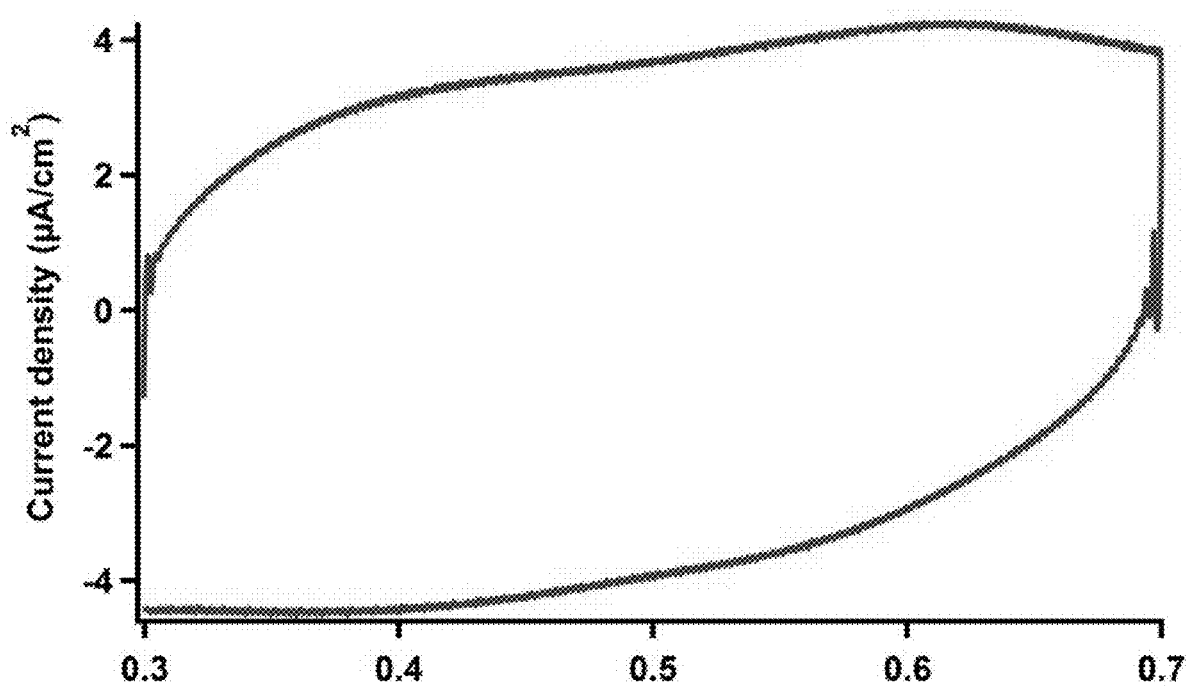
FIG. 19 shows a cyclic voltammogram of a clean Au foil in an aqueous 0.1 M $HClO_4$ solution. Potentials measured versus an Ag/AgCl reference electrode in 1 M KCl. The 1 $cm^2$ Au substrate was used as the working electrode and glassy carbon as the auxiliary electrode.
Figure 20:
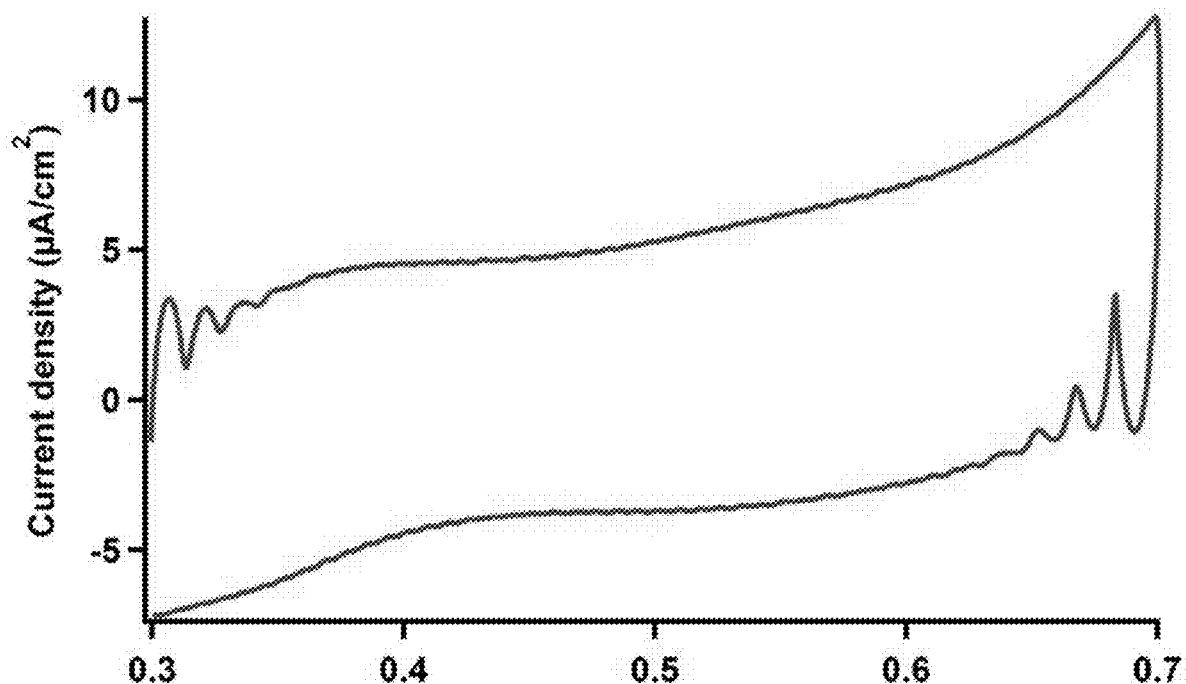
FIG. 20 shows a cyclic voltammogram of an Au foil after pyrene-functionalization in an aqueous 0.1 M $HClO_4$ solution. Potentials measured versus an Ag/AgCl reference electrode in 1 M KCl. The 1 $cm^2$ Au substrate was used as the working electrode and glassy carbon as the auxiliary electrode.
Figure 21A:
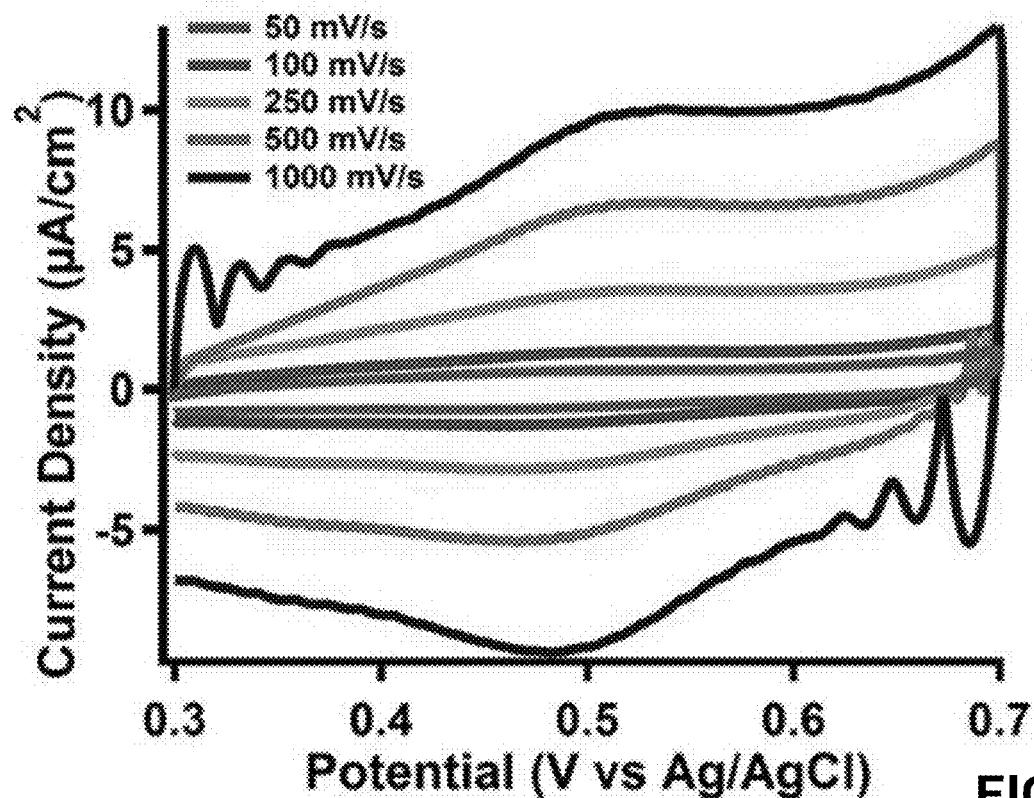
FIG. 21A-21B show electrochemical characterization of 2 non-covalently bound to a pyrene-modified gold surface.
Figure 21B:
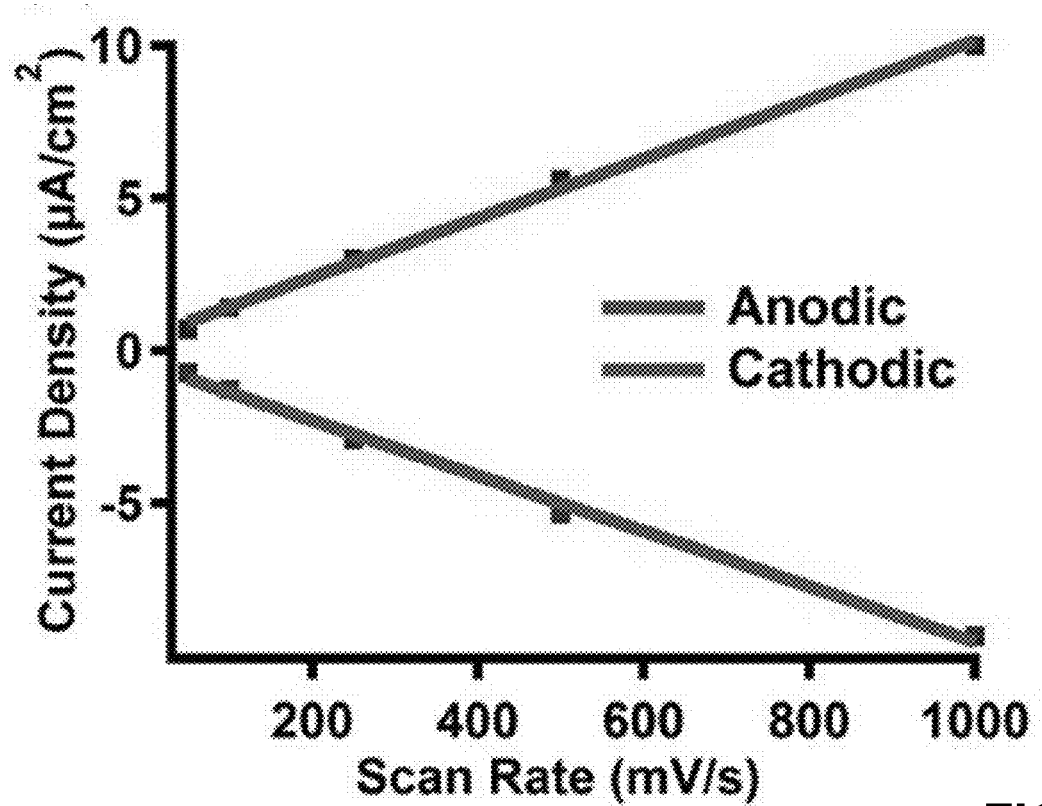

The electrode materials were investigated using cyclic voltammetry in 0.1 M perchloric acid. The cyclic voltammograms of clean gold electrodes, as well as electrodes modified with pyrene, did not show any features between 0.3 and 0.7 V vs. Ag/AgCl, as shown in FIG. 19 and FIG. 20, respectively. However, upon treatment of the latter surface with pyrene-functionalized ferrocene (2), a reversible couple is observed ($E_{1/2}$=495 mV) (FIG. 21A).

Figure 22:
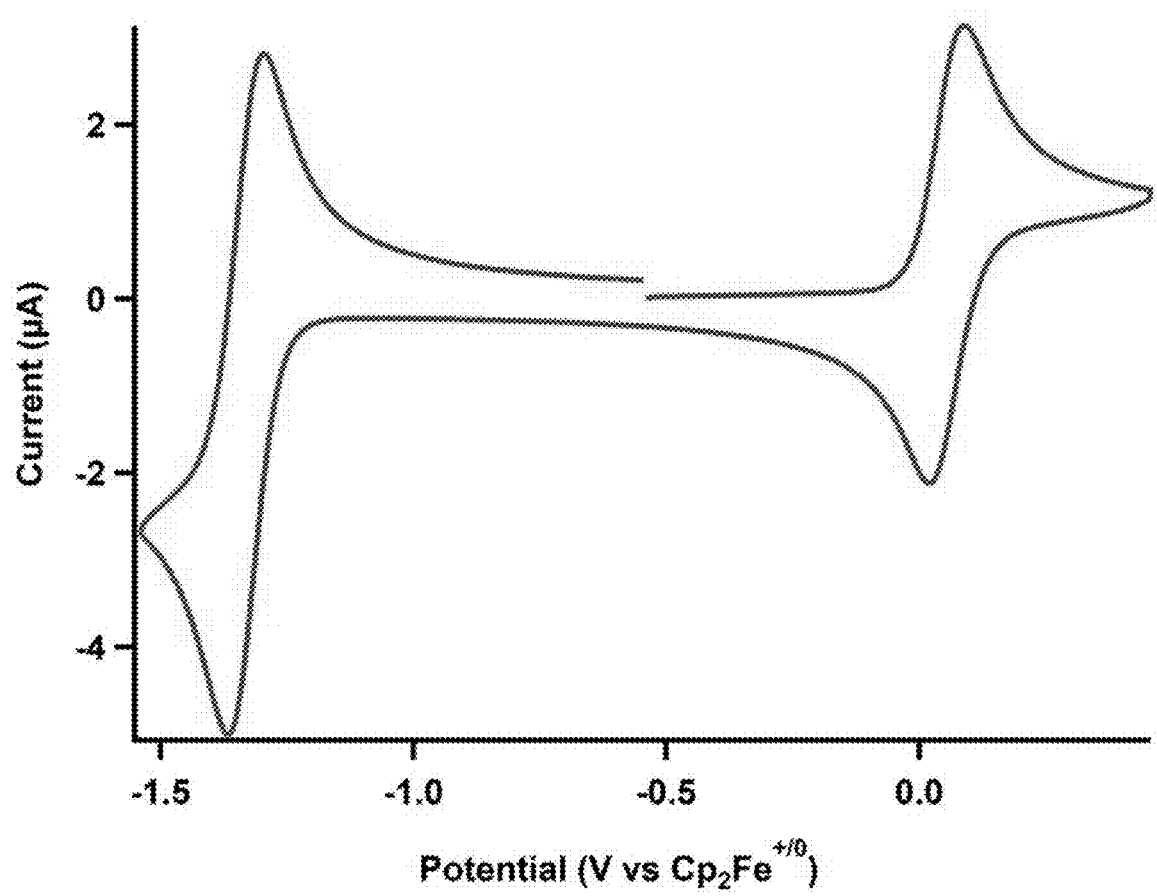
FIG. 22 shows a cyclic voltammogram of 2 in $CH_3CN$ with a 100 mV/s scan rate and a 1 mM analyte in 0.1 M $[Bu_4N][PF_6]$ solution with internal cobaltocene reference. Potentials reported versus the cobaltocene/cobaltocenium redox couple shown at −1.38 V. Glassy carbon working and auxiliary electrodes; Ag/Ag$^+$ pseudo-reference electrode. $E_{1/2}$=1.38 V vs. $Cp_2Co^{+/0}$. $[Cp_2Co][PF_6]$ was used as the internal standard because 2 has an indistinguishable couple to ferrocene when measured together.
Figure 23A:
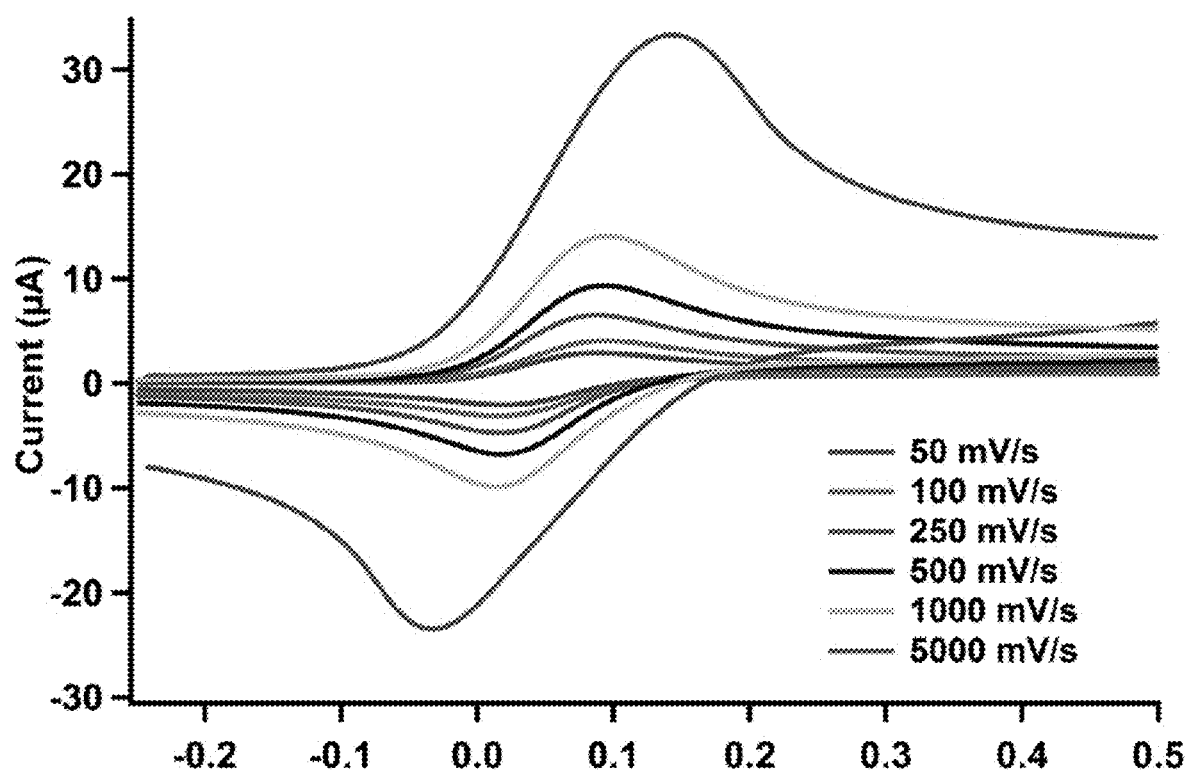
FIG. 23A shows a variable scan rate cyclic voltammogram of 2 in $CH_3CN$ ($E_{1/2}$=0.055 V vs. $Cp_2Fe^{+/0}$) with scan rates varying from 50-5000 mV/s and a 1 mM analyte in 0.1 M $[Bu_4N][PF_6]$ solution with an internal cobaltocene reference. Glassy carbon working and auxiliary electrodes; Ag/Ag$^+$ pseudo-reference electrode. Potentials were measured against the cobatocene/cobaltocenium redox couple and then referenced to the ferrocene/ferrocenium redox couple (−1.33 V vs. $Cp_2Fe^{+/0}$) using previously reported values from N. G. Connelly and W. E. Geiger, Chem. Rev., 1996, 96, 877-910.
Figure 23B:
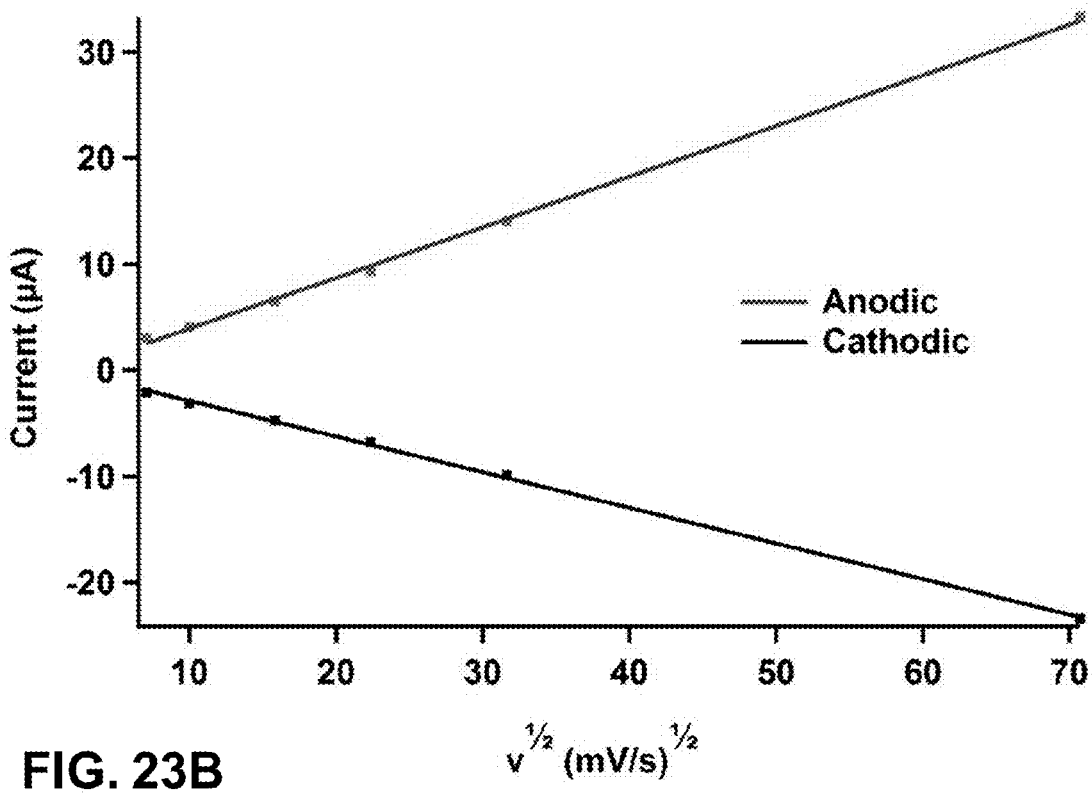
FIG. 23B shows a plot of current vs. the square root of scan rate from cyclic voltammograms in FIG. 23A. The linear trend for both anodic and cathodic waves suggests diffusion control of the analyte, 2, which is expected for a non-surface bound species.

Cyclic voltammograms of 2 taken under homogeneous conditions in acetonitrile displays a 1 e$^-$ reversible couple, as shown in FIGS. 22, 23A, and 23B. Due to the insolubility of 2, a similar homogeneous cyclic voltammogram in 0.1 M perchloric acid could not be performed to compare to the redox event observed after physisorption to the surface. However, the $E_{1/2}$ value that was observed is consistent with that of surface bound ferrocene species measured in aqueous solvents, as reported in E. D. Chidsey, C. R. Bertozzi, T. M. Putvinski and A. M. Mujsce, *J. Am. Chem. Soc.*, 1990, 112, 4301-4306. The scan rate also displays a linear dependence on the peak anodic or cathodic current (FIG. 21B), indicating fast electron transfer to surface-bound species.

Figure 24:
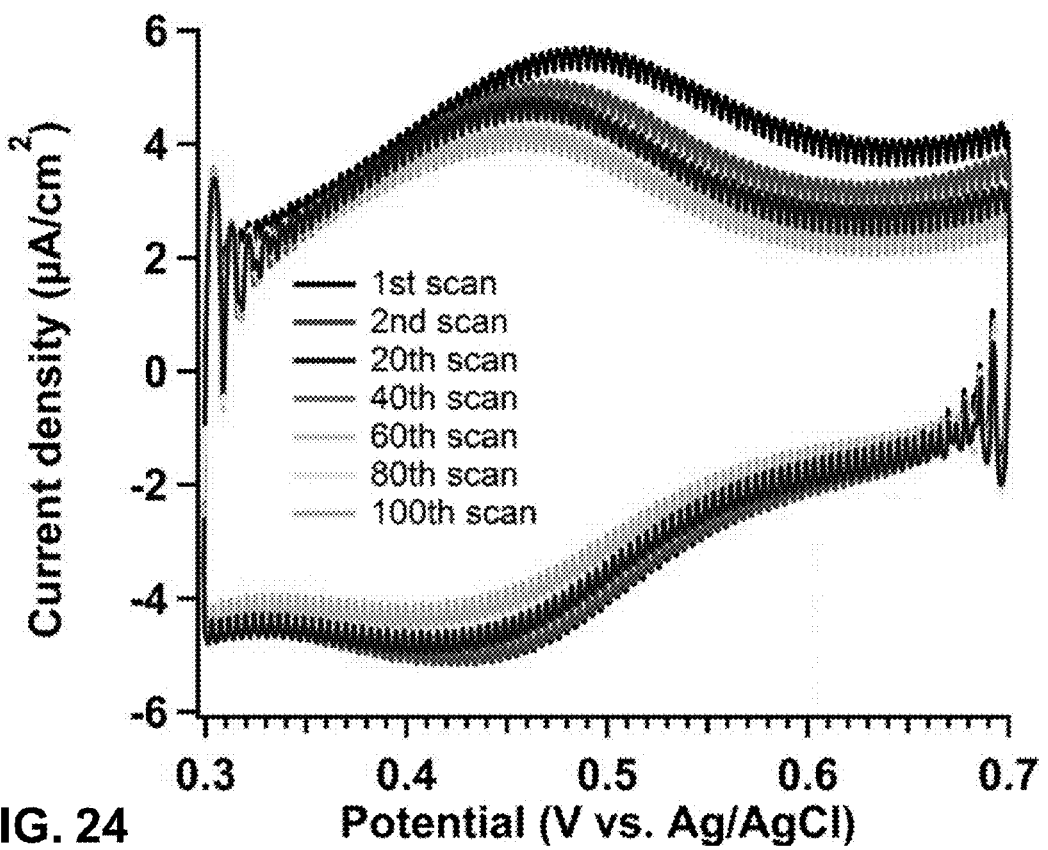
FIG. 24 shows a cyclic voltammogram of a gold substrate functionalized with pyrene followed by exposure to 2. 100 subsequent oxidation/reduction cycles were performed to probe redox stability of the pi-pi interactions fixing 2 to the surface. The voltammogram was recorded in an aqueous 0.1 M $HClO_4$ solution at 250 mV/s. Potentials were measured versus an Ag/AgCl reference electrode in 1 M KCl. The 1 cm² Au substrate was used as the working electrode and glassy carbon as the auxiliary electrode.

Surface coverage of 2 was estimated by integration of the faradaic current of the anodic wave. Surface coverage was calculated between Γ=5-28 pmol/cm$^2$ across all samples. The same method was used to analyze the stability of 2 bound to the surface after repeated oxidation/reduction cycles (FIG. 24). Experiments with up to 100 redox cycles did not show evidence for loss of 2 from the surface, as the Faradaic current for the cathodic and anodic events remains relatively constant. The results of this experiment, summarized in Table 1, suggest good stability of the pi-pi interactions under redox conditions in acidic media.

Table 1. Calculated surface concentrations (Γ) of 2 for oxidative ($Γ_O$) and reductive waves ($Γ_R$) for various scans from the voltammogram shown in FIG. 24, assuming a 1 e$^-$ oxidative or reductive process. Surface concentrations were calculated through integration of the faradaic current per cm$^2$, divided by scan rate and then divided by Faraday's constant.

| Scan # | Γ$_O$ (pmol/cm$^2$) | Γ$_R$ (pmol/cm$^2$) |
|---|---|---|
| 1 | 17.1 | 8.8 |
| 2 | 16.8 | 7.5 |
| 20 | 16.6 | 9.6 |
| 40 | 19.8 | 10.4 |
| 60 | 13.9 | 8.7 |
| 80 | 15 | 9.1 |
| 100 | 17.5 | 8.4 |
| Average | 16.7 | 8.9 |
| Standard deviation | 1.9 | 0.9 |

A clean gold electrode treated with 2 under the same conditions did not show any redox active species in the same range (FIG. 25), indicating no physisorption of the ferrocene to clean gold surfaces. This is consistent with the conclusions from the XPS and infrared spectroscopy measurements.

The aforementioned surface characterization demonstrates that a gold electrode modification by covalent attachment of pyrene permits physisorption of a pyrene-functionalized ferrocene. Furthermore, the pyrene-functionalized ferrocene is stable on the surface even after washing with solvents in which the molecular species is soluble. Without wishing to limit the invention to a particular theory or mechanism, the electrochemical studies demonstrate that electron transfer through this interface is facile, demonstrating ideal reversible behaviour for the ferrocene redox couple.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A surface-modified electrode comprising:
   a. a conductive substrate; and
   b. a surface modifying layer disposed on a surface of the conductive substrate, wherein the surface modifying layer comprises a two-part surface modification agent comprising:
      i. a polyaromatic derivative having a polyaromatic moiety and a reactive functional group; and
      ii. a molecular analyte complex comprising a molecular analyte functionalized with a polyaromatic moiety;
   wherein the reactive functional group of the polyaromatic derivative is covalently bound to the surface of the conductive substrate, and wherein the molecular analyte complex is non-covalently attached to the polyaromatic derivative via π-interactions of aromatic stacking between the polyaromatic moiety of the molecular analyte complex and the polyaromatic moiety of the polyaromatic derivative such that the molecular analyte complex is physisorbed onto the surface of the conductive substrate.

2. The surface-modified electrode of claim 1, wherein the surface of the conductive substrate is constructed from a non-carbon material.

3. The surface-modified electrode of claim 1, wherein the surface of the conductive substrate is constructed from a gold material, an indium tin oxide material, or a gallium phosphide material.

4. The surface-modified electrode of claim 1, wherein the surface-modified electrode is a positive electrode or negative electrode.

5. The surface-modified electrode of claim 1, wherein the surface-modified electrode is an electrode for an electrochemical device.

6. The surface-modified electrode of claim 5, wherein the electrochemical device is a photoelectrochemical cell, an electrochemical cell, a sensor, or an electrochromic device.

7. The surface-modified electrode of claim 1, wherein the surface modifying layer is effective for protecting the surface of the conductive substrate from corrosion.

8. The surface-modified electrode of claim 1, wherein the polyaromatic moiety of the molecular analyte complex is a pyrene, a coronene, or an anthracene, wherein the polyaromatic moiety of the polyaromatic derivative is a pyrene, a coronene, or an anthracene, wherein the polyaromatic moiety of the molecular analyte complex is optionally the same as the polyaromatic moiety of the polyaromatic derivative.

* * * * *